United States Patent
Santhosh Kumar et al.

(10) Patent No.: US 12,518,842 B2
(45) Date of Patent: Jan. 6, 2026

(54) SAMPLE AND HOLD CIRCUITRY, ANALOGUE-TO-DIGITAL CONVERTER CIRCUITRY INCLUDING SAME, AND SAMPLING CIRCUITRY FOR SAMPLING INPUT VOLTAGE ON SAMPLING CAPACITOR

(71) Applicant: Socionext Inc., Kanagawa (JP)

(72) Inventors: Sandeep Santhosh Kumar, Maidenhead (GB); Vlad Cretu, Maidenhead (GB); Masahiro Kudo, Maidenhead (GB)

(73) Assignee: Socionext Inc., Kanagawa (JP)

(*) Notice: Subject to any disclaimer, the term of this patent is extended or adjusted under 35 U.S.C. 154(b) by 229 days.

(21) Appl. No.: 18/454,125

(22) Filed: Aug. 23, 2023

(65) Prior Publication Data

US 2024/0079071 A1    Mar. 7, 2024

Related U.S. Application Data

(60) Provisional application No. 63/374,379, filed on Sep. 2, 2022.

(51) Int. Cl.
    *H03M 1/12*    (2006.01)
    *G11C 27/02*    (2006.01)
    *H03K 19/0185*    (2006.01)

(52) U.S. Cl.
    CPC ..... *G11C 27/02* (2013.01); *H03K 19/018507* (2013.01); *H03M 1/1245* (2013.01)

(58) Field of Classification Search
    CPC .......................................... H03K 19/018507

(Continued)

(56) References Cited

U.S. PATENT DOCUMENTS 9,349,484 B2    5/2016    Verbruggen et al.
9,621,157 B2*    4/2017    Chiang ............... G11C 27/026

(Continued)

FOREIGN PATENT DOCUMENTS

EP    4106197    12/2022
ES    2478791    7/2014

OTHER PUBLICATIONS

Sandeep Santhosh Kumar et al., "A 750mW 24GS/s 12b Time-Interleaved ADC for Direct RF Sampling in Modern Wireless Systems", Session 17, High-Speed Data Converters, 17.4, 2023 IEEE International Solid-State Circuits Conference, Digest of Technical Papers, pp. 270-271.

(Continued)

*Primary Examiner* — Peguy Jean Pierre
(74) *Attorney, Agent, or Firm* — IPUSA, PLLC

(57) ABSTRACT

A sample-and-hold circuit includes a sampling capacitor, a bootstrapped signal sampling switch transistor between an input voltage and a first node of the sampling capacitor, and a common-mode switch transistor connected between a second node of the sampling capacitor and a common-mode voltage. The bootstrapped signal sampling switch transistor is controlled by a gate voltage that is dependent on the input signal voltage so as to provide a substantially signal-independent gate-source voltage to turn on the transistor. The common-mode switch transistor is controlled by a programmable gate voltage such that it becomes possible to trim the series on-resistance of the above-mentioned switch transistors to allow for calibration of a sample-and-hold circuit bandwidth.

15 Claims, 10 Drawing Sheets

(58) Field of Classification Search
USPC .......................................................... 341/122
See application file for complete search history.

(56) References Cited

U.S. PATENT DOCUMENTS

| | | | | |
|---|---|---|---|---|
| 10,037,814 | B2* | 7/2018 | Aggrawal | G11C 27/024 |
| 10,630,278 | B2* | 4/2020 | Sekiya | G11C 27/026 |
| 11,601,121 | B2* | 3/2023 | Cascio | H04B 1/40 |

OTHER PUBLICATIONS

Mas Alexandre et al: "Analog bandwidth mismatch compensation for time-interleaved ADCs using FD-SOI technology", 2017 IEEE International Symposium On Circuits and Systems (ISCAS), IEEE May 28, 2017 (May 28, 2017), pp. 1-4, XP033155895, DOI: 10.1109/ISCAS.2017.8050246, [retrieved on Sep. 25, 2017], * abstract *, * Section II *, * Section III.A and III.B *, * Equations (4) and (5) *, * figures 1 4*.

Martens Ewout et al: "A 69-dB SNDR 300-MS/s Two-Time Interleaved Pipelined SAR ADC in 16-nm CMOS FinFET With Capacitive Reference Stabilization", IEEE Journal of Solid-State Circuits, IEEE, USA, vol. 53, No. 4, Apr. 2018 (Apr. 1, 2018), pp. 1161-1171, XP011679945, ISSN: 0018-9200, DOI: 10.1109/ JSSC.2017.2784762, [retrieved on Mar. 23, 2018], * Section IV.B *, * figure 4 *.

Verbruggen Bob et al: "A 70 dB SNDR 200 MS/s 2.3 mW dynamic pipelined SAR ADC in 28nm digital CMOS" 2014 Symposium On Vlsi Circuits Digest of Technical Papers, IEEE, Jun. 10, 2014 (Jun. 10, 2014), pp. 1-2, XP032622384, DOI: 10.1109/VLSIC.2014.6858451, ISBN: 978-1-4799-3327-3, [retrieved on Jul. 17, 2014], * Completes the disclosure of D4 regarding the programmable bootstrap voltage for bandwidth calibration.* , * figures 1,3,5 *.

Extended European Search Report mailed on Feb. 13, 2024 issued with respect to the corresponding European Patent Application No. 23192952.2.

* cited by examiner

SAMPLE AND HOLD CIRCUITRY, ANALOGUE-TO-DIGITAL CONVERTER CIRCUITRY INCLUDING SAME, AND SAMPLING CIRCUITRY FOR SAMPLING INPUT VOLTAGE ON SAMPLING CAPACITOR

CROSS-REFERENCE TO RELATED APPLICATION

This application claims priority of U.S. Provisional Application No. 63/374,379, filed Sep. 2, 2022, the contents of which are incorporated herein by reference in their entirety.

BACKGROUND

The present invention relates to sampling switch circuits or sampling circuitry.

More specifically, the present invention relates to the control of one or more performance properties of such circuitry. Frequency bandwidth (or simply bandwidth) is one example of a performance property which may be controlled by the techniques disclosed herein. Gain and phase, for example at a given frequency, are other examples of performance properties which may be controlled by the techniques disclosed herein.

Sampling circuits and circuitry in line with the present invention may be referred to as sampling switch circuitry, sample-and-hold circuitry, Sample and Hold (S/H) switch circuitry, track-and-hold circuitry, or Track and Hold (T/H) switch circuitry, or similar. The present disclosure therefore relates to the control of one or more performance properties of S/H or T/H systems, for example as may be employed in an ADC (analogue-to-digital converter) which samples a continuous time high frequency waveform, for example as part of its front-end sampler.

As background, FIG. 1 presents example SAR ADC (Successive Approximation Register ADC) circuitry which may be employed as part of a larger set of ADC circuitry to generate a digital output from an analogue voltage input by SAR conversion. The main elements are a S/H (Sample/Hold—or sampler) circuit 170 to acquire (sample or track) an input voltage $V_{IN}$ and output a held output voltage $V_{OUT}$, a voltage comparator 180, an internal DAC 190 and an SAR (Successive Approximation Register) 195. It will be appreciated that the arrangement of elements in FIG. 2 is a simple example to aid in an overview understanding of the functionality of SAR ADC circuitry. However, in other arrangements (where e.g. charge-redistribution techniques are used, with the DAC 190 being a capacitive DAC or CDAC), some of the functionality of the elements (e.g. the S/H 170) may be provided as part of the functionality of another element (e.g. the DAC 190).

Continuing with FIG. 1, the comparator 180 compares the held $V_{OUT}$ with the output of the internal DAC 190 and outputs the result of the comparison to the SAR 195. The SAR 195 is designed to supply a digital code approximating the held output voltage $V_{OUT}$ to the internal DAC 190. The DAC 190 supplies the comparator with an analogue voltage based upon the digital code input from the SAR 195.

In this example, the SAR 195 is initialised so that its MSB is equal to digital 1 (the other bits being digital 0). This code is then input to DAC 190, whose output analogue voltage is supplied to comparator 180. If this analogue voltage is greater than $V_{OUT}$ the comparator 180 causes SAR 195 to reset this bit; otherwise, the bit is kept as a 1. Then, the next bit is set to 1 and the same procedure (sub-conversion operation) is followed, continuing this binary search until every bit in the SAR 195 has been tested (these "tests" corresponding respectively to a series of sub-conversion operations). The resulting digital code output from the SAR 195 is the digital approximation of the held output voltage $V_{OUT}$ (and therefore also of the input voltage $V_{IN}$ as sampled by the S/H circuit 170) and is finally output when the conversion is complete.

Voltage mode and current mode sampling is known in general terms, and a sample-and-hold circuit such as S/H circuit 170 in FIG. 1 may be considered an example of a voltage mode sampling circuit.

In a typical voltage mode sampler, a sampling transistor such as a field-effect transistor (FET) acts as a simple switch which is ON during a sample (sampling, tracking or output) phase, to sample the input voltage onto a sampling capacitor, and is OFF during a hold phase, so that the sampled voltage is held on the sampling capacitor. Where the voltage mode sampler is part of an analogue-to-digital converter (ADC), for example as part of the SAR ADC circuitry of FIG. 1, inaccuracies in the voltage mode sampler may result in errors/inaccuracies in the digital output signal.

FIG. 2 is a schematic diagram of a sampling switch circuit 200, useful for an overall understanding of the sample and hold process. The sampling switch circuit 200 adopts a top plate sampling topology, for simplicity of explanation. An input signal $V_{IN}$ (corresponding to $V_{IN}$ in FIG. 1) is applied to a source (source terminal) of a sampling switch $M_S$, in this case a transistor (in particular, a field-effect transistor). A voltage source $V_0$ (e.g., a battery) is then connected between the source and the gate (gate terminal), via a clock-controlled switch, so that the voltage $V_0+V_{IN}$ is applied to the gate of the sampling switch $M_S$ during the sample phase where $V_0$ is a constant voltage. The gate is separately connected via another clock-controlled switch to ground (ground supply voltage). A sampling capacitor $C_S$ is connected to the drain (drain terminal) of the sampling switch $M_S$, which serves as the output node of the circuit 200, where an output signal $V_{OUT}$ (corresponding to held output voltage $V_{OUT}$ in FIG. 1) is produced. The sampling capacitor $C_S$ is connected between the drain and ground.

Normally, $V_0=V_{DD}$ as shown, where $V_{DD}$ is the supply voltage, and this allows a maximum possible gate-source voltage over the device $M_S$ which creates the minimum on-resistance. In FIG. 5, CLK is the sampling clock (clock signal) with a frequency $f_s$.

The operation of the circuit 200 is as follows. When CLK is high (and −CLK is low), the gate of the sampling switch $M_S$ is connected to ground (ground supply voltage). The terms "high" and "low" may refer to voltage levels such as digital voltage levels, for example to $V_{DD}$ and GND (0 V) voltage levels, respectively. The transistor $M_S$ is thus OFF and the circuit 200 is in a hold or holding phase (or stage) where the sampled value (voltage) on the sampling capacitor $C_S$ is held. When CLK is low (−CLK is high), $V_{IN}+V_{DD}$ is applied to the gate of the switch. The transistor $M_S$ is thus ON and the circuit 200 now enters tracking mode (sample phase) and the voltage across the sampling capacitor $C_S$ tracks the input signal $V_{IN}$. The gate-source voltage in the tracking mode is thus $V_{IN}+V_{DD}-V_{IN}=V_{DD}$, i.e., independent of the input signal $V_{IN}$.

The configuration seen in FIG. 2, where a battery is connected between $V_{IN}$ and the gate of the sampling transistor $M_S$, may be referred to as a bootstrap circuit, which may be used in order to boost (i.e., increase) a voltage level at the gate terminal of the sampling transistor beyond that of a reference voltage signal available. Of course, a battery is a simple example given in order to describe the general bootstrap concept.

Precise control of switches is advantageous in many systems. It is especially useful in time-interleaved ADCS, where a continuous time signal is sampled by such sampling circuitry in multiple paths/phases. However, signal bandwidth in modern devices is ever increasing, and is quickly approaching possible bandwidth limits of common processes/transistors.

It has been found that the performance of existing sampling switch circuits and/or sampling circuitry is open to improvement.

SUMMARY

According to an embodiment of a first aspect of the present invention, there is provided a sample and hold (track and hold) circuit comprising: an input node to which an input voltage signal is configured to be supplied; a first reference voltage node to which a first reference voltage potential is configured to be supplied; a sampling capacitor circuit; a sampling switch transistor circuit connected between the input node and the sampling capacitor circuit; a first common mode switch transistor circuit connected between the sampling capacitor circuit and the first reference voltage node; a signal bootstrap circuit configured to generate a first control voltage based on a clock signal, the first control voltage varying according to a level of the input voltage signal, and configured to control the sampling switch transistor circuit based on the first control voltage; and a static bootstrap circuit configured to generate a second control voltage based on the clock signal, the second control voltage being programmable, and configured to control the first common mode switch transistor circuit based on the second control voltage.

According to an embodiment of a second aspect of the present invention, there is provided an analog-to-digital converter (ADC) circuit comprising: a plurality of the sample and hold (track and hold) circuits of the aforementioned first aspect; and a plurality of sub-ADC circuits each configured to receive an output signal from a corresponding one of the plurality of the sample and hold (track and hold) circuits and perform an analog-to-digital conversion of the output signal.

According to an embodiment of a third aspect of the present invention, there is provided a sample and hold (track and hold) circuit comprising: a first input node to which one of differential input voltage signals is configured to be supplied; a second input node to which the other of the differential input voltage signals is configured to be supplied; a first reference voltage node to which a first reference voltage potential is configured to be supplied; a first sampling capacitor circuit; a second sampling capacitor circuit; a first sampling switch transistor circuit connected between the first input node and the first sampling capacitor circuit; a second sampling switch transistor circuit connected between the second input node and the second sampling capacitor circuit; a first common switch transistor circuit connected between the first sampling capacitor circuit and the first reference voltage node; a second common switch transistor circuit connected between the second sampling capacitor circuit and the first reference voltage node; a first signal bootstrap circuit configured to generate a first control voltage based on a clock signal, the first control voltage varying according to a level of the one of differential input voltage signals, and configured to control the first sampling switch transistor circuit based on the first control voltage; and a second signal bootstrap circuit configured to generate a second control voltage based on the clock signal, the second control voltage varying according to a level of the other of the differential input voltage signals, and configured to control the second sampling switch transistor circuit based on the second control voltage; and a static bootstrap circuit configured to generate a third control voltage based on the clock signal, the third control voltage being programmable, and configured to control the first and second common switch transistor circuits based on the third control voltage.

According to an embodiment of a fourth aspect of the present invention, there is provided an analog-to-digital converter (ADC) circuit comprising: a plurality of the sample and hold (track and hold) circuits of the aforementioned third aspect; and a plurality of sub-ADC circuits each configured to receive an output signal from a corresponding one the plurality of the sample and hold (track and hold) circuits and perform an analog-to-digital conversion of the output signal.

According to an embodiment of a fifth aspect of the present invention, there is provided integrated circuitry, such an IC chip, comprising the sample and hold (track and hold) circuit of the aforementioned first or third aspect, or the analog-to-digital converter (ADC) circuit of the aforementioned second or fourth aspect.

According to an embodiment of a sixth aspect of the present invention, there is provided sampling circuitry, comprising: a sampling circuit; and control circuitry, wherein the sampling circuit comprises: an input node, connected to receive an input voltage signal to be sampled; a reference node, connected to receive a reference voltage signal; one or more sample-path transistor circuits; a sampling capacitor connected between the input node and the reference node via the one or more sample-path transistors; and clock-controlled circuitry configured, in each of a series of sample phases defined by a clock signal, to control a control voltage of the one or more sample-path transistor circuits to conductively connect the sampling capacitor between the input node and the reference node to sample the input voltage signal on the sampling capacitor, and wherein the control circuitry is configured to control a performance property of the sampling circuit by controlling a magnitude of the control voltage of at least one of the one or more sample-path transistor circuits applied by the clock-controlled circuitry in the sample phases.

According to an embodiment of a seventh aspect of the present invention, there is provided the sampling circuitry of the aforementioned sixth aspect, wherein: the sampling circuit is a first sampling circuit; the sampling circuitry comprises a second sampling circuit; and the control circuitry is configured, based on measures of the performance properties of the first and second sampling circuits, to control the performance property of the first sampling circuit to reduce a difference between those performance properties.

According to an embodiment of an eighth aspect of the present invention, there is provided the sampling circuitry of the aforementioned sixth aspect, wherein: the sampling circuit is a first sampling circuit; the sampling circuitry comprises at least a second sampling circuit; the performance property comprises a combined performance property of a combination of the sampling circuits; and the control circuitry is configured, based on measures of the combined performance property, to control the magnitude of the control voltage of the at least one of the one or more sample-path transistor circuits of at least one of the sampling circuits to control the combined performance property.

According to an embodiment of a ninth aspect of the present invention, there is provided sampling circuitry, comprising: a plurality of sampling circuits; and control circuitry, wherein each sampling circuit comprises: an input node, connected to receive an input voltage signal to be sampled; a reference node, connected to receive a reference voltage signal; one or more sample-path transistor circuits; a sampling capacitor connected between the input node and the reference node via the one or more sample-path transistors; and clock-controlled circuitry configured, in each of a series of sample phases defined by a clock signal, to control a control voltage of the one or more sample-path transistor circuits to conductively connect the sampling capacitor between the input node and the reference node to sample the input voltage signal on the sampling capacitor, and wherein the control circuitry is configured to control a combined performance property of a combination of the sampling circuits by controlling, for at least one of the sampling circuits or all but one of the sampling circuits, a magnitude of the control voltage of at least one of the one or more sample-path transistor circuits applied by the clock-controlled circuitry in the sample phases.

According to an embodiment of a tenth aspect of the present invention, there is provided multi-channel sampling circuitry, comprising the sampling circuitry of any of the aforementioned seventh to ninth aspects, wherein: each said sampling circuit is configured to operate based on its own clock signal, optionally of set of time-interleaved clock signals; and the input nodes for said sampling circuits are connected together to form a common input node and receive the same input voltage signal as one another.

According to an embodiment of an eleventh aspect of the present invention, there is provided an analogue-to-digital converter, comprising the sampling circuitry of any of the aforementioned sixth to ninth aspects, or the multi-channel sampling circuitry of the aforementioned tenth aspect.

According to an embodiment of a twelfth aspect of the present invention, there is provided integrated circuitry, such an IC chip, comprising the sampling circuitry of any of the aforementioned sixth to ninth aspects, or the multi-channel sampling circuitry of the aforementioned tenth aspect, or the analogue-to-digital converter of the aforementioned eleventh aspect.

BRIEF DESCRIPTION OF THE DRAWINGS

Reference will now be made, by way of example, to the accompanying drawings, of which.

DETAILED DESCRIPTION

The present inventors have considered sampling circuitry in the context of advanced signal bandwidth/gain/phase requirements. Considering sampling in a multi-channel (or multi-path) system where the paths are time-interleaved, and assuming a sample path to be a simple single pole system with 3-dB bandwidth of 10 GHz, and processing a maximum input frequency of 10 GHz, a 2% p-p (peak-to-peak) bandwidth mismatch causes 1% p-p gain mismatch and 1.2% p-p phase mismatch and limits SFDR (Spurious Free Dynamic Range) to 56 dBc. For a high-resolution ADC with an SFDR of >70 dBc, it is desirable to reduce the 2% p-p bandwidth mismatch between phases/paths to <0.4% p-p. Against this backdrop, it is desirable to precisely control the frequency bandwidth, gain or phase (as example performance properties) of a single channel/path as well as of multiple channels/paths relative to one another. It is desirable for a frequency bandwidth, gain or phase (as examples of a performance property) of such paths to be precisely matched/controlled to minimise the power of time-interleaved frequency spurs. Bandwidth, gain and phase here may be relative values given the multiple channels/paths, for example relative gain, relative phase and relative bandwidth. The gain, phase and bandwidth may be measured/estimated based on the output signals (samples) of the sampling circuitry.

Previously-considered performance property control techniques, for example, bandwidth calibration techniques, rely on a) programmable sampling capacitor tuning (which the present inventors consider can significantly affect the designed bandwidth and create performance limitations in the circuit) or b) digital background correction with FIR (finite impulse response) filters of required gain and phase profiles (a process which the present inventors consider consumes significantly high power in high data rate applications).

As will be described herein, the proposed sampling circuitry is configured to control the 'on' gate voltage of a switch in (i.e., connected along) the signal conduction path, or sample path, of a sampling circuit of the sampling circuitry, in order to vary the on resistance of that switch and thereby control a performance property of that sampling circuit (and therefore also of the overall sampling circuitry) with high precision and/or accuracy. The performance property may be, for example, frequency bandwidth, gain or phase. The performance property may be, for example, gain or phase at a given frequency such as a maximum frequency of a target or designed frequency bandwidth of operation. The proposed technique for precise performance property control is versatile and can be configured for different levels of precision, and can also be extended to, in some arrangements, match a bandwidth/gain/phase property between any number of parallel paths (i.e. multiple sampling circuits of such sampling circuitry).

Figure 3:
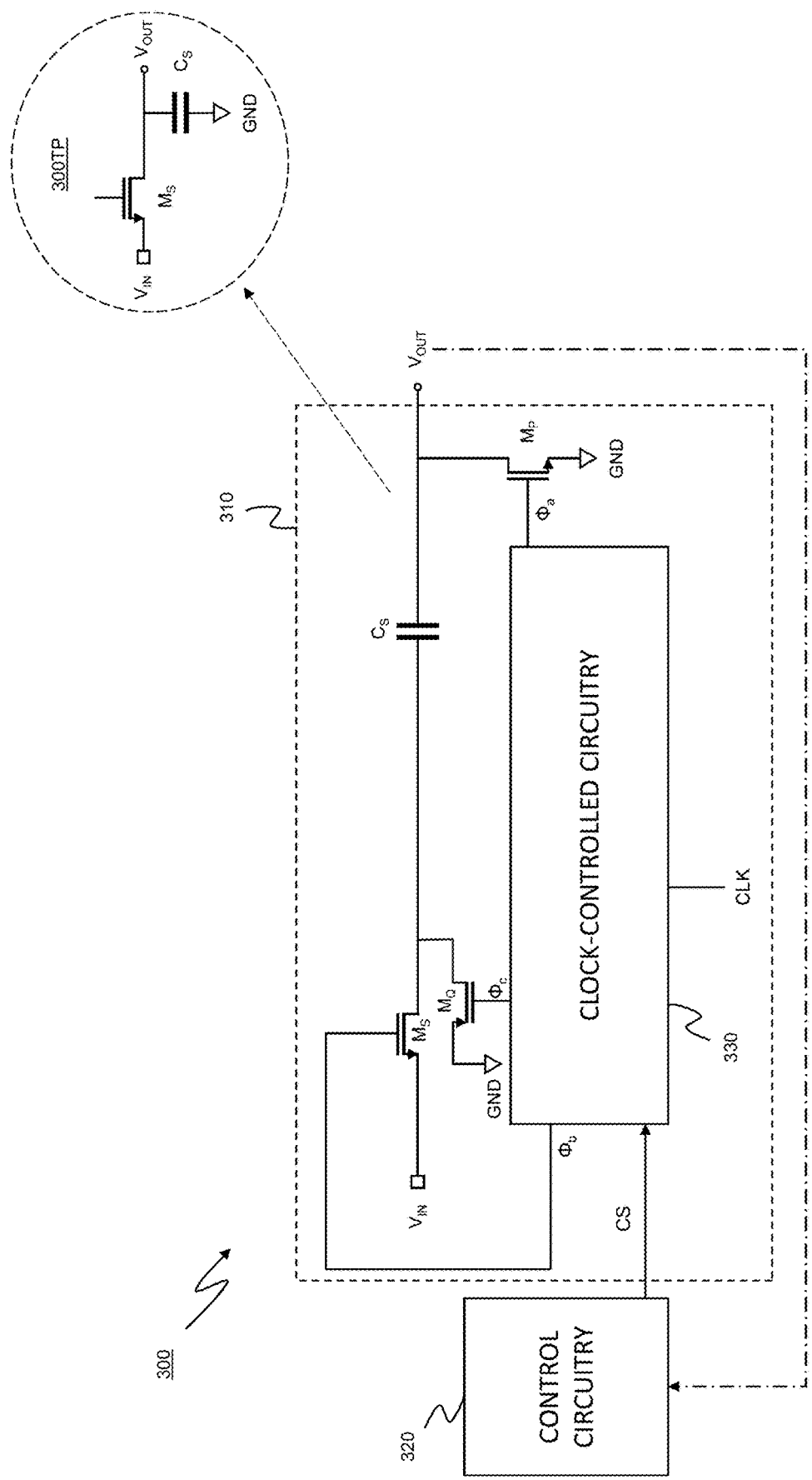
FIG. 3 is a schematic diagram of sampling circuitry embodying the present invention.

FIG. 3 is a schematic diagram of sampling circuitry 300 embodying the present invention.

Sampling circuitry 300 comprises a sampling circuit 310 and control circuitry 320. References herein to sampling may be considered references to "sample and hold" and/or "track and hold".

The sampling circuit 310 comprises an input node $V_{IN}$, connected to receive an input voltage signal $V_{IN}$ to be sampled, a reference node GND, connected to receive a reference voltage signal GND, sample-path transistor transistors $M_S$, $M_P$, and a sampling capacitor $C_S$ connected between the input node $V_{IN}$ and the reference node GND via the sample-path transistors $M_S$, $M_P$. The sampling circuit 310 also comprises clock-controlled circuitry 330.

The sample-path transistors $M_S$, $M_P$ may be referred to as sample-path transistor circuits (switch transistor circuits), and indeed may be implemented by combinations of transistors, but will be referred to simply as transistors going forwards for simplicity. It will be appreciated that all other transistors may be referred to similarly as transistor circuits, and that similarly capacitors may be referred to as capacitor circuits. Similar teaching applies to other components. Transistor $M_S$ may be referred to as a sampling switch transistor circuit in some arrangements. Transistor $M_P$ may be referred to as a common mode switch transistor circuit in some arrangements.

The sampling circuit 310 adopts a bottom plate sampling topology, and therefore comprises an additional transistor $M_Q$ (whose channel is connected between the input node $V_{IN}$ and a further reference node GND via the channel of the sampling transistor $M_S$) as commented on in more detail later. Such bottom plate sampling topology is carried forward herein as a running example.

However, it will be appreciated later that the techniques described herein may be applied to a top plate sampling topology, as indicated in Figure at the top right with variant 300TP where the transistors $M_P$ and $M_Q$ are not needed, so that in a minimum case only one sample-path transistor $M_S$ need be provided. With this in mind, in general a sampling circuit according to the techniques disclosed herein may have one or more sample-path transistors (transistor circuits).

Returning to the sampling circuit 310, the sample-path transistors $M_S$, $M_P$ are connected such that the transistor $M_S$ (sampling transistor, or first sample-path transistor) is connected between the input node $V_{IN}$ and sampling capacitor $C_S$, and the transistor $M_P$ (or second sample-path transistor) is connected between the sampling capacitor $C_S$ and the reference node GND. The sampling capacitor $C_S$ is connected between the input node $V_{IN}$ and the reference node GND via channels of the sample-path transistor circuits $M_S$, $M_P$.

An output node $V_{OUT}$ is connected between the sampling capacitor $C_S$ and the second sample-path transistor $M_P$. In some arrangements, other/further sample-path transistors may be connected along/to the sample path (i.e., between the input node $V_{IN}$ and the output node $V_{OUT}$).

For simplicity, the input node and the input voltage signal will both be referred to as $V_{IN}$. Similar considerations apply to other voltage nodes and corresponding voltage signals of the present disclosure (e.g., reference node GND and reference voltage signal GND).

The reference node GND is connected to receive a reference voltage signal GND (which may be a particular reference voltage, i.e., VCC, 0V or ground potential). The reference voltage signal GND (and any other reference voltage signals described herein) may be a (substantially constant) DC reference voltage signal. Also, references to GND may be considered as references to a reference voltage signal in general, whose voltage level is relatively low compared to that of a higher reference voltage signal, which may be referred to as $V_{DD}$. Also, where multiple connections to GND are shown, for example as in FIG. 3, it may be that those have different voltage levels in some arrangements.

The sampling circuit 310 may be a sample and hold or track and hold circuit. At least one of the sample-path transistors may be a field-effect transistor, and the control voltage of that sample-path transistor may be a gate voltage of the transistor.

Control circuitry 320 is connected to the clock-controlled circuitry 330 and supplies the clock-controlled circuitry 330 with a control signal CS. The control signal CS may be a single control signal or may be a plurality of control signals.

Clock-controlled circuitry 330 is connected to the sampling transistor $M_S$, and the second sample-path transistor $M_P$, and is configured to receive an input clock signal CLK. While clock-controlled circuitry 330 has been shown as a single block, the clock-controlled circuitry 330 may comprise a plurality of clock-controlled circuitries corresponding to respective sample-path transistors. For example, clock-controlled circuitry 330 may include clock-controlled circuitry for controlling the sampling transistor $M_S$, and also include (different/separate) clock-controlled circuitry for controlling the second sample-path transistor $M_P$. Similarly, clock-controlled circuitry 330 may include (different/separate) clock-controlled circuitry for controlling the transistor $M_Q$. This plurality of clock-controlled circuitries may be shown as discrete/separate clock-controlled circuitry blocks (as per some of the later Figures) but will be understood to collectively form clock-controlled circuitry 330.

The clock-controlled circuitry 330 is configured, in each of a series of sample phases defined by a clock signal CLK, to control a control voltage $\phi a$, $\phi b$ of the sample-path transistors $M_S$, $M_P$ to conductively connect the sampling capacitor $M_S$ between the input node $V_{IN}$ and the reference node GND to sample the input voltage signal $V_{IN}$ on the sampling capacitor $M_S$. The clock-controlled circuitry 330 is configured, in each of a series of hold phases also defined by the clock signal CLK (so that the sampling circuit 310 has alternating sample and hold phases), to control the control voltage $\phi a$, $\phi b$ of the sample-path transistors $M_S$, $M_P$ to conductively disconnect the sampling capacitor $C_S$ from the input node $V_{IN}$ and from GND in order to hold the sampled voltage on the sampling capacitor $C_S$. The control voltages $\phi a$, $\phi b$ may be held relatively stable or constant in or for each of the phases, with their magnitudes changing between sample and hold phases, in the form of stepped waveforms.

Figure 1:
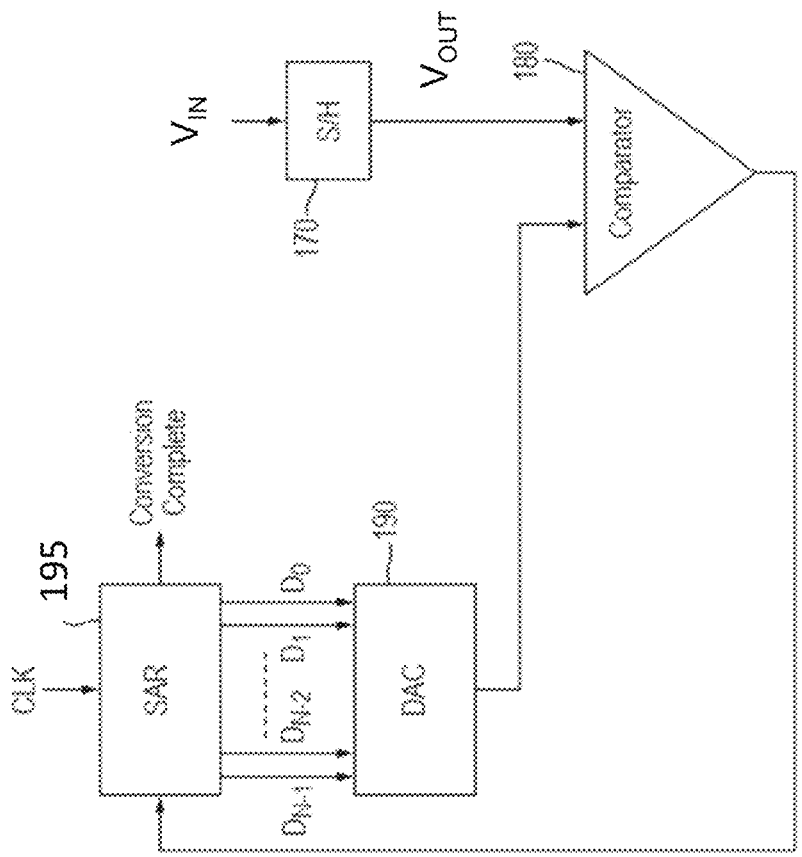
FIG. 1, considered above, presents example SAR ADC circuitry.

Given the bottom plate sampling topology employed in FIG. 3, the clock-controlled circuitry 330 is also configured, in each of the sample phases, to control the control voltage $\phi_c$ of the transistor $M_Q$ to conductively disconnect the top plate of the sampling capacitor $C_S$ (the plate closest to $V_{IN}$) from GND, and in each of the hold phases to control the control voltage $\phi c$ to conductively connect the top plate of the sampling capacitor $C_S$ to GND so that the sampled voltage held on the sampling capacitor $C_S$ can be "read" from the bottom plate of the sampling capacitor $C_S$ (the plate closest to $V_{OUT}$), for example subjected to SAR approximation in line with FIG. 1. The control voltage $\phi c$ may also be held relatively stable or constant in or for each of the phases, with its magnitude changing between sample and hold phases.

Figure 2:
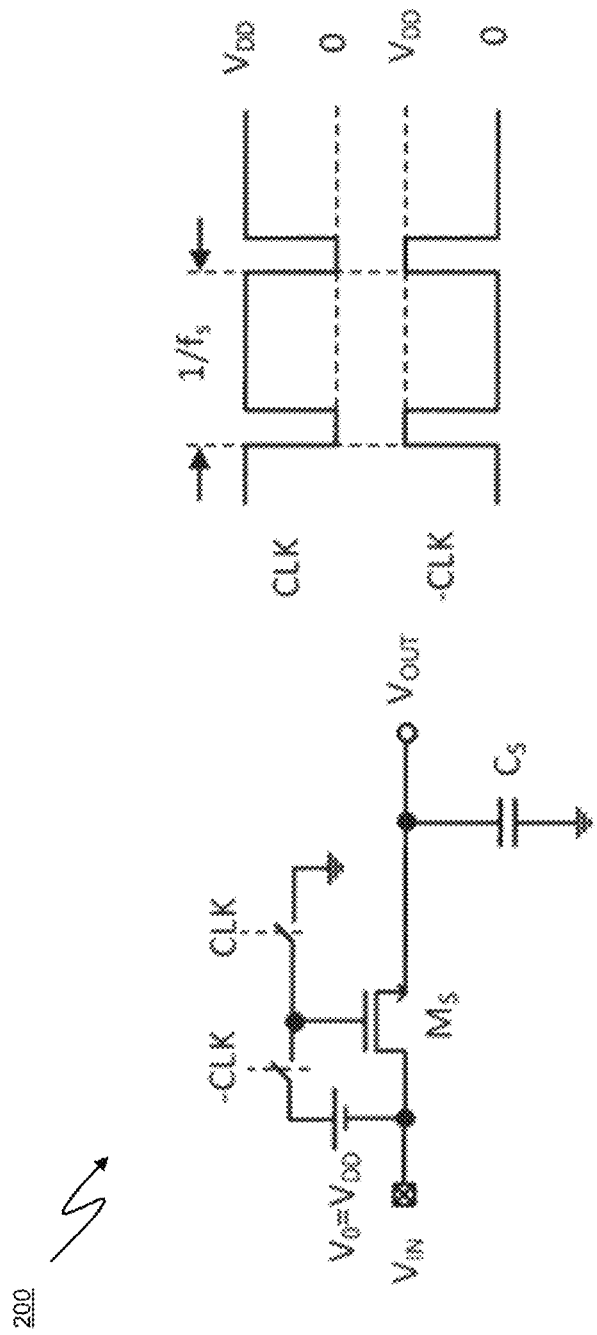
FIG. 2, also considered above, is a schematic diagram of a previously-considered sampling switch circuit.

Although FIG. 3 adopts a bottom plate sampling topology rather than a top plate sampling topology, such operation will be readily understood in line with the operation explained in connection with FIG. 2.

That is, the clock-controlled circuitry 330 (or the clock-controlled circuitries thereof) is configured to control the transistors $M_S$, $M_P$, $M_Q$ using respective control voltages in accordance with the clock signal CLK. The clock signal CLK may for example define the sample phases and hold phases of the sampling transistor $M_S$ and thus of the overall sampling circuit 310. The clock-controlled circuitry 330 provides control signals (gate signals) to the transistors $M_S$, $M_P$, $M_Q$ in order to control operation of those transistors so that they cooperatively configure the sampling circuit 310 for the sample and hold phases.

The control circuitry 320 is configured to control a performance property of the sampling circuit 310 by controlling a magnitude of the control voltage of at least one of the sample-path transistors $M_S$, $M_P$ applied by the clock-controlled circuitry 330 in the sample phases.

Controlling the control voltage magnitude may comprise at least one of: setting or programming the control voltage magnitude, calibrating the control voltage magnitude (with reference to a default control voltage value), adjusting the control voltage magnitude (from a previous or default control voltage value), controlling the control voltage magnitude so that it tends towards a target (control voltage) magnitude, or controlling the control voltage magnitude so that it is substantially the same for a plurality of sample phases or a plurality of consecutive sample phases.

The clock-controlled circuitry 330 is configured to define the control voltage magnitude based on a value of the control signal CS provided by the control circuitry 320. The control circuitry 320 is configured to control the performance property of the sampling circuit 310 by controlling the value of the control signal CS.

Controlling the value of the control signal may comprise at least one of: setting or programming the value of the control signal, calibrating the value of the control signal (with reference to a default value of the control signal), adjusting the value of the control signal (from a previous or default value of the control signal), controlling the value of the control signal so that it tends towards a target value (of the control signal), or controlling the value of the control signal so that it is substantially the same for a plurality of sample phases or a plurality of consecutive sample phases. The control signal CS may be programmable by the control circuitry 320, whereby the control voltage magnitude is programmable by the control circuitry 320.

A performance property may be a measurable property of the sampling circuitry 300 or sampling circuit 310 which is affected by control of the sample-path transistors $M_S$, $M_P$. For example, when the performance property is or comprises a frequency bandwidth, the frequency bandwidth may be controlled by controlling a control voltage of at least one of the sample-path transistors $M_S$, $M_P$. Increasing the control voltage (i.e., a gate voltage) decreases the on-resistance of the sample-path transistor (where the transistor is an NMOS switch) and thus increases frequency bandwidth. Other performance properties which may be affected in this way may be gain and phase, for example as measured at a given frequency as mentioned earlier. As another example, when the performance property is linearity or distortion, for example taking into account the output voltage $V_{OUT}$ of a plurality of sampling circuits 310, the performance property may be controlled by controlling a control voltage of at least one of the one or more sample-path transistors $M_S$, $M_P$ (of at least one of the plurality of sampling circuits 310). Where a plurality of sampling circuits 310 are used together, for example using time-interleaved clocks in a time-interleaved ADC, a performance property of any one or more of those sampling circuits 310 may be controlled to reduce mismatch in that property (or in a combination or properties) between the sampling circuits 310. Where a plurality of sampling circuits 310 are used together, a combined performance property of the combination of the plurality of sampling circuits may be controlled.

It is recalled from variant 300TP in FIG. 3 that, in some arrangements, the transistors $M_P$ and $M_Q$ are not needed, and thus in such arrangements the control circuitry 320 may control a performance property of the sampling circuit 310 by controlling a magnitude of the control voltage of (only) the sample-path transistor $M_S$ in the sample phases. Similar teaching applies where there is a plurality of sampling circuits 310, such that the performance property may be controlled by controlling a control voltage of (only) the sample-path transistor $M_S$ (of at least one of the plurality of sampling circuits 310). The present disclosure will be understood accordingly.

Figure 4:
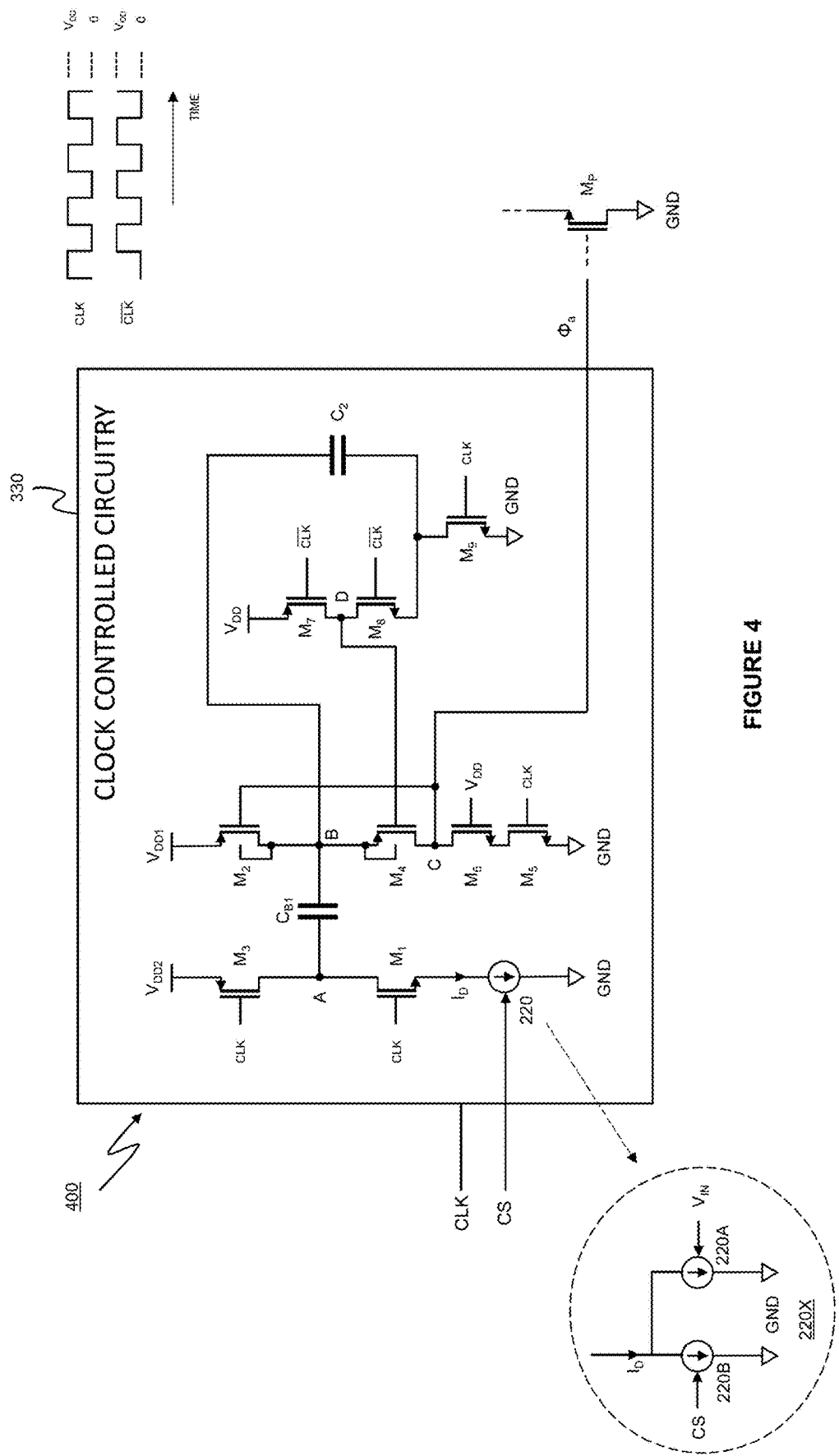
FIG. 4 is a schematic diagram of a switching circuit which may be employed in the circuitry of FIG. 3.
Figure 5:
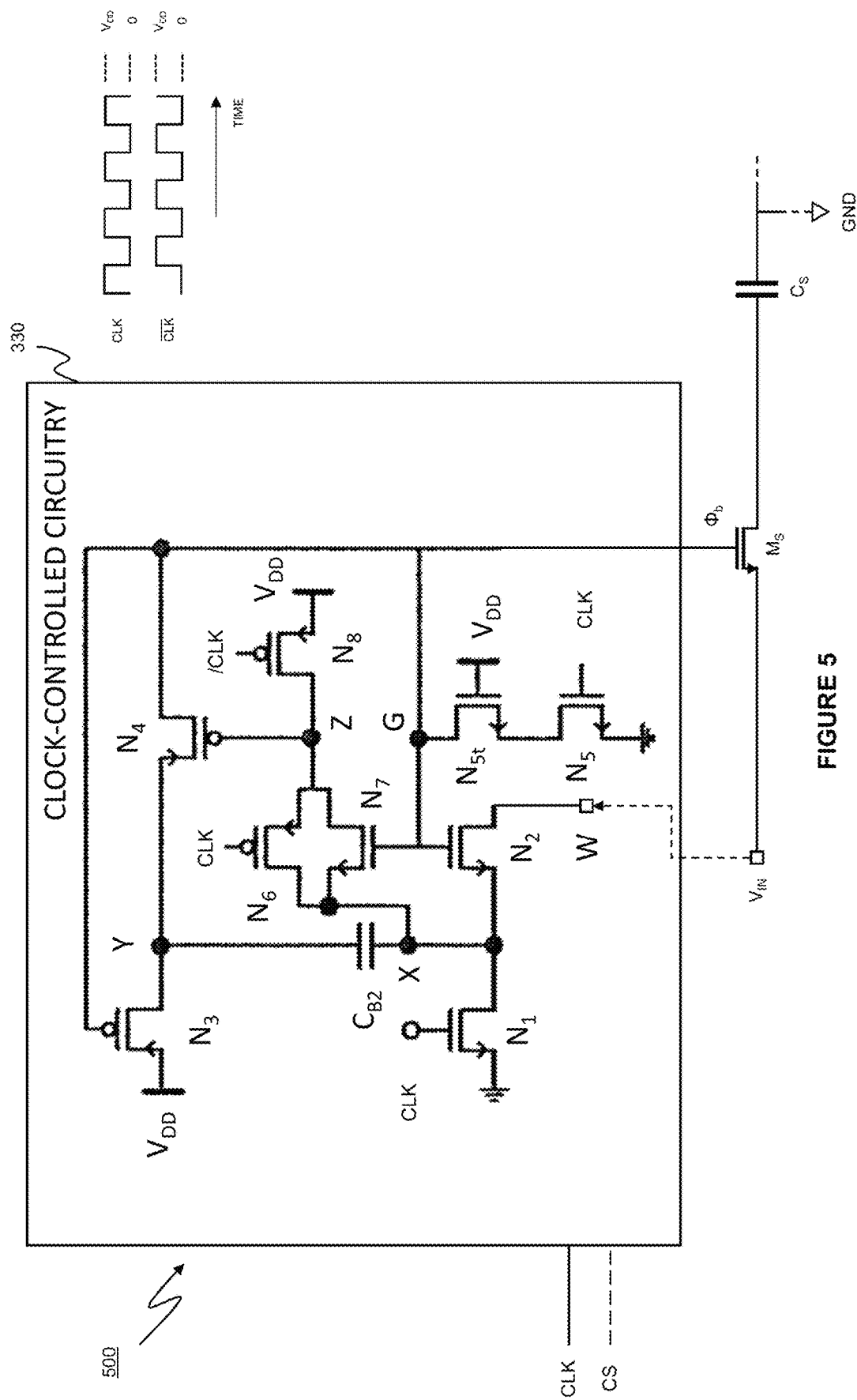
FIG. 5 is a schematic diagram of a switching circuit which may be employed in the circuitry of FIG. 3.

Operation of the circuitry of FIG. 3 may be more fully understood by considering exemplary arrangements of clock-controlled circuitry 330 with respect to FIGS. 4 and 5.

In line with FIGS. 4 and 5, as explained in more detail below, the reference node GND and the reference voltage signal GND are a first reference voltage node (first reference voltage node) and a first reference voltage signal (first reference voltage potential), respectively, and the sampling circuit 310 comprises (e.g., as part of the clock-controlled circuitry 330) a second reference node $V_{DD}$, connected to receive a second reference voltage signal $V_{DD}$. The clock-controlled circuitry 330 may in such an arrangement (although not shown in FIG. 3) comprise control-voltage generation circuitry configured to generate the control voltage of the at least one sample-path transistor by connecting a charged voltage-boost capacitor $C_B$ to the second reference node VDD, i.e. between the second reference node VDD and a control terminal (gate terminal) of the at least one sample-path transistor. Such circuitry may be referred to herein as a bootstrap circuit. In such a case, the control circuitry 320 may be configured to control the magnitude of the control voltage by controlling at least one of: a magnitude of the second reference voltage signal VDD; a capacitance of the voltage-boost capacitor $C_B$; and an amount of charge stored on the voltage-boost capacitor $C_B$. The control circuitry 320 may be configured to control the amount of charge stored on the voltage-boost capacitor $C_B$ by controlling a magnitude of a current used to charge the voltage-boost capacitor $C_B$.

As will be apparent from FIGS. 4 and 5, the second reference voltage signal $V_{DD}$ may be a power supply voltage signal. The control-voltage generation circuitry may be configured to connect the charged voltage-boost capacitor $C_B$ to the second reference node $V_{DD}$ so that the generated control voltage is larger than a voltage of the second reference voltage signal $V_{DD}$. The control voltage may be referred to as a bootstrap, or bootstrapped, voltage, which is larger than a maximum voltage provided by a power supply which generates the second reference voltage signal $V_{DD}$. In FIG. 4 the voltage-boost capacitor is denoted $C_{B1}$ and in FIG. 5 it is denoted $C_{B2}$.

The control-voltage generation circuitry may be (or may be referred to as) a bootstrap circuit or a voltage-controlled clock level shifter circuit, and may be configured to generate a control voltage for one or more of the sample-path transistors. A bootstrap circuit may be considered a circuit designed to increase/decrease the maximum control voltage available based on the limits of a power supply. A voltage-controlled clock level shifter circuit may increase/decrease the voltage level of an input clock signal.

The control-voltage generation circuitry may be, or may be referred to as gate-voltage generation circuitry, for controlling the gate-voltage of the one or more sample-path transistors.

FIG. 4 is a schematic diagram of a switching circuit 400 which is an exemplary arrangement of at least part of the clock-controlled circuitry 330 as connected to the second sample-path transistor $M_P$. The switching circuitry 400 may be referred to as a static bootstrap circuit and is generally configured to output the control voltage $\phi_a$ to (a gate terminal of) the second sample-path transistor $M_P$ in accordance with the input clock signal CLK and the control signal CS. Circuitry 400 is thus one arrangement of a static bootstrap circuit which is configured to control a control voltage for controlling one or more of the sample path transistors $M_S$, $M_P$.

As explained above, the switching circuitry 400 may form one of a set of clock-controlled circuitries of the clock-controlled circuitry 330, in this case representing circuitry configured to control the second sample-path transistor $M_P$. The switching circuit 400 may be considered an example implementation of the clock-controlled circuitry 330. Additional circuitry for controlling the sampling transistor $M_S$ is omitted for simplicity. Second sample-path transistor $M_P$ is shown beside the clock-controlled circuitry 330 to aid in the below explanation of how the switching circuitry 400/clock-controlled circuitry 330 operates.

The switching circuitry 400 as described below uses the control signal CS to shift or adjust or control or calibrate (for example, increase) a magnitude of a control voltage to be applied to sample-path transistor $M_P$ (but could be employed to control another transistor such as transistor $M_S$).

A timing diagram of the clock signal CLK is shown in the top right corner of FIG. 4.

Transistors $M_7$ to $M_9$, capacitor $C_2$ and the attached voltage reference nodes may be considered a protection circuit, in order to help prevent voltages across transistor $M_4$ from exceeding those of a safe-operating range. Depending on the application, the components of the protection circuit need not be provided as commented on later.

The current source 220 is configured to cause a defined current $I_D$ to flow therethrough and is a controllable current source. In FIG. 4, the current source 220 is controllable by control signal CS.

The capacitor $C_{B1}$ comprises first and second terminals, marked as A and B, and may be considered a voltage-boost capacitor, or first capacitor. The switching circuitry 400 comprises first to sixth transistors, $M_1$ to $M_6$. Such transistors are implemented as field-effect transistors, here MOSFETs, but may be any other type of transistor (as is the case for the other transistors considered herein).

The first and second transistors $M_1$ and $M_2$ may be considered a first pair of switches and the third and fourth transistors $M_3$ and $M_4$ may be considered a second pair of switches. The seventh to ninth transistors $M_7$ to $M_9$ may be considered a protection set of switches, or switches forming part of the protection circuit. Each of transistors $M_1$ to $M_9$ comprises a gate terminal, a source terminal and a drain terminal (as for other field-effect transistors).

In order to fully appreciate the operation of switching circuit 400 as detailed below, transistors $M_1$ to $M_9$ will be described in terms of N- and P-type MOSFETS, and their operation relative to clock signals CLK and/CLK (or the inverse of clock signal CLK). In this configuration, an N-type transistor is ON when a gate signal is HIGH or ON and the N-type transistor is OFF when a gate signal is LOW or OFF. A P-type transistor is ON when a gate signal is LOW or OFF and the P-type transistor is OFF when a gate signal is HIGH or ON.

It will be understood that the types of MOSFET and clock signal used may vary together in other implementations (i.e., using clock signal CLK with an N-type transistor, instead of clock signal/CLK with a P-type transistor) in order to achieve the same functionality in a given precharge or output configuration (described below).

Focusing on the first pair of switches, the first transistor $M_1$ is connected between the first terminal A of the capacitor $C_{B1}$ and the current source 220, and the second transistor $M_2$ is connected between the second terminal B of the capacitor $C_{B1}$ and a first voltage reference node $V_{DD1}$. The current source 220 is connected between the first transistor $M_1$ and a further reference voltage node, which may be considered as a ground voltage reference node (GND). Transistor $M_1$ is an N-type transistor, and transistor $M_2$ is a P-type transistor. Transistor $M_1$ has its gate terminal connected to clock signal CLK.

Turning to the second pair of switches, the third transistor $M_3$ is connected between the first terminal A of the capacitor $C_{B1}$ and a second voltage reference node $V_{DD2}$, and the fourth transistor $M_4$ is connected between the second terminal B of the capacitor $C_{B1}$ and the gate terminal of the second sample-path transistor $M_P$, marked as node C.

While shown as being connected to the second sample-path transistor $M_P$, node C may generally be considered the control voltage output of the switching circuit 400, for connection to any sample-path transistor.

Node C is also connected to the gate terminal of transistor $M_2$. Transistors $M_3$ and $M_4$ are P-type transistors. Transistor $M_3$ has its gate terminal connected to clock signal CLK. The voltage reference node $V_{DD1}$ is configured to provide a reference voltage signal $V_{DD1}$ and the voltage reference node $V_{DD2}$ is configured to provide a reference voltage signal $V_{DD2}$, which may be DC (supply) voltage signals. The voltage levels at nodes $V_{DD1}$ and $V_{DD2}$ may be the same as one another or may be different from one another. The ground voltage reference node GND is configured to provide a ground reference voltage signal, which may be a DC (supply) voltage signal. Nominally, the voltage level at the ground voltage reference node GND may be referred to as 0 V. The (supply) voltage levels at nodes $V_{DD1}$ and $V_{DD2}$ may be referred to as $V_{DD1}$ and $V_{DD2}$ for convenience, as explained above. The voltage reference node GND may correspond to the first voltage reference node mentioned earlier. The voltage reference node $V_{DD2}$ may correspond to the second voltage reference node mentioned earlier.

The sixth transistor $M_6$ is connected between the gate terminal of the sampling transistor, node C, and the fifth transistor $M_5$ is connected between the sixth transistor $M_6$ and a further reference voltage node, which may also be a ground voltage reference node (GND) as indicated but which in other arrangements may provide a DC voltage signal having a voltage level other than that of ground (i.e. 0 V).

Transistor $M_5$ (or the combination of the fifth and sixth transistors $M_5$ and $M_6$) may be described as a holding switch connected between the gate terminal of the second sample-path transistor $M_P$ and the further reference voltage reference node. In the precharge configuration the holding switch is ON and in the output configuration the holding switch ($M_5$) is OFF. The further reference voltage node is configured to provide a further reference voltage signal, optionally being a DC voltage signal and optionally having a voltage level for causing the difference between voltage levels provided at the gate and source terminals of the second sample-path transistor $M_P$, when the switching circuitry is in the precharge configuration, to be less than the threshold voltage of the second sample-path transistor $M_P$. Such a voltage causes the second sample-path transistor to be OFF.

Transistor $M_6$ is placed between node C and $M_5$ in order to protect transistor $M_4$, since a drain-source voltage over transistor $M_4$ may exceed the safe-operating range of the transistor where a relatively large voltage charged on the capacitor $C_B$ is seen at the source terminal of transistor $M_4$ and a relatively low voltage (i.e., GND) is seen at the drain terminal of transistor $M_4$ through transistor $M_5$. Transistors $M_5$ and $M_6$ are N-type transistors. Transistor $M_5$ has its gate terminal connected to clock signal CLK and transistor $M_6$ has its gate terminal connected to a constant voltage supply $V_{DD}$.

The protection set of switches $M_7$ to $M_9$, alongside further reference nodes and capacitor $C_2$, form the protection circuit. Capacitor $C_2$ may be described as a second capacitor. Capacitor $C_2$ is connected between node B and transistor $M_9$, where transistor $M_9$ is also connected to a further reference node (i.e., GND). Transistor $M_8$ is connected between transistor $M_9$ and the gate terminal of transistor $M_4$, marked as node D. Transistor $M_7$ is connected between node D and a further reference voltage node $V_{DD}$. In the same way that switching circuit 400 may be considered a bootstrap circuit of the second sample-path transistor M2, the protection circuit may be considered a bootstrap circuit for transistor $M_4$. Transistor $M_7$ is a P-type transistor, and transistors $M_8$ and $M_9$ are N-type transistors. Transistors $M_7$ and $M_8$ have their respective gate terminals connected to clock signal/CLK and transistor $M_9$ has its gate terminal connected to clock signal CLK.

The switching circuit 400 is configured to operate in (switch between, or alternate between) a precharge configuration (for hold phases of the sampling circuit 310) and an output configuration (for sample phases of the sampling circuit 310) in dependence upon the clock signal, CLK.

In the precharge configuration, the circuitry of the switching circuit 400 connects the capacitor $C_{B1}$ into a current path between the current source 220 and the voltage reference node $V_{DD1}$ to form a potential difference (or store an amount of charge) across the capacitor $C_{B1}$ which is dependent on the defined current $I_D$ (and the voltage level $V_{DD1}$ relative to GND). In the output configuration, the switching circuitry connects the capacitor $C_{B1}$ between the voltage reference node $V_{DD2}$ and the gate terminal of the sampling transistor so that a voltage level applied at the gate terminal of the second sample-path transistor $M_P$, node C, is dependent on the defined current $I_D$ (and the voltage level $V_{DD2}$).

As can be appreciated from the above description, the control voltage (at the output of the switching circuitry 400, node C, and applied at the gate terminal of the second sample-path transistor $M_P$) may be controlled based on defined current $I_D$, controlled by the control signal CS output from the control circuitry 320 (not shown).

When CLK is high (e.g., $V_{DD}$) and/CLK is low (e.g., GND), the switching circuitry 400 is configured into the precharge configuration.

In this configuration, the first transistor $M_1$ is ON and the third transistor $M_3$ is OFF. The fifth and sixth transistors $M_5$ and $M_6$ are both ON, and so the switching circuitry 400 is configured to connect the gate terminal of the second sample-path transistor $M_P$ to the further voltage reference node (here, GND) so that a voltage level applied at the gate terminal of the second sample-path transistor $M_P$ in the precharge configuration is dependent on a voltage level provided at the further voltage reference node. In FIG. 4, node C is provided with a ground voltage (i.e., GND) through transistors $M_5$ and $M_6$.

The ground voltage at node C turns ON transistor $M_2$, providing node B with a voltage $V_{DD1}$, and providing a first terminal of capacitor $C_2$ with voltage $V_{DD1}$. Transistor $M_7$ is ON and transistor $M_8$ is OFF, and so node D is provided with voltage $V_{DD}$ through transistor $M_7$ and turns transistor $M_4$ OFF. Transistor $M_9$ is ON and provides a ground voltage to a second terminal of capacitor $C_2$.

In this arrangement, the gate terminal of the second sample-path transistor $M_P$ is therefore provided with a ground voltage GND through node C and the second sample-path transistor $M_P$ is controlled to be OFF. This is the hold phase of the sampling circuit 310.

Also in the precharge configuration, the capacitor $C_{B1}$ is connected into a current path between the current source 220 and the voltage reference node $V_{DD1}$. A potential difference forms across the capacitor $C_{B1}$ which is dependent on the defined current $I_D$ as described earlier. Specifically, the potential difference across the capacitor $C_{B1}$ becomes proportional to the defined current $I_D$. For example, if the defined current $I_D$ were to increase, a voltage $V_A$ at node A would decrease, so that a potential difference $V_{DD1}-V_A$ across the capacitor $C_{B1}$ would increase.

The switching circuitry 400 connects the second capacitor $C_2$ to form a given potential difference across the second capacitor. Capacitor $C_2$ is connected into a current path between node B (provided with a first reference voltage $V_{DD1}$) and ground voltage through transistor $M_9$, and $C_2$ charges to voltage $V_{DD1}$.

When CLK is low and/CLK is high, the switching circuitry is configured into the output configuration.

In this configuration, the first transistor $M_1$ is OFF and the third transistor $M_3$ is ON. The fifth transistor $M_5$ is OFF (the sixth transistor $M_6$ remains ON), and so node C is no longer provided with a ground voltage (i.e., GND). Transistor $M_7$ is OFF, transistor $M_8$ is ON, and transistor $M_9$ is OFF and so transistor $M_9$ no longer provides a ground voltage to the second terminal of capacitor $C_2$. Node D is thus connected to the second terminal of capacitor $C_2$, and the switching circuitry connects the second capacitor $C_2$ between the gate (node D) and source (node B) terminals of the fourth transistor (switch) $M_4$ so that a gate-source voltage of the fourth transistor (switch) $M_4$ is defined by the potential difference stored across the second capacitor $C_2$ at the end of the precharge phase, and becomes effectively $-V_{DD1}$ which turns the fourth transistor (switch) $M_4$ ON.

In this arrangement, the gate terminal (node C) of the second sample-path transistor $M_P$ is provided with a voltage $V_{DD2}+(V_{DD1}-V_A)$ through transistor $M_4$ and node C (turning OFF transistor $M_2$), and the second sample-path transistor $M_P$ is controlled to be ON. This is the sample phase of the sampling circuit 310.

Note that if the protection circuit were removed and the gate terminal of the fourth transistor (switch) $M_4$ were driven by the clock signal CLK, then the magnitude of the gate-source voltage of the fourth transistor (switch) $M_4$ in this arrangement would become $V_{DD2}+(V_{DD1}-V_A)$, i.e. the same as the voltage level at node B, and this may be beyond the operating limit for gate-source voltage of the fourth transistor (switch) $M_4$. By providing the protection circuit the magnitude of the gate-source voltage of the fourth transistor (switch) $M_4$ in this arrangement becomes $V_{DD1}$ as above, keeping that gate-source voltage within acceptable limits. In some arrangements, as mentioned earlier, it may be that the protection circuit is unnecessary and the gate terminal of the fourth transistor (switch) $M_4$ may be driven by the clock signal CLK.

As above, the current source 220 is controllable and configured such that the defined current $I_D$ is dependent on the control signal CS and switching circuitry 400 may be used to control not only when the second sample-path transistor $M_P$ is on or off but also its on resistance when it is on.

A variant of the switching circuitry 400 may be provided (in addition to that of FIG. 4) as part of the clock-controlled circuitry 330 and connected to control a control voltage of the sampling transistor $M_S$ instead of the second sample-path transistor $M_P$. In such a case, the current source 220 may be controlled by the input voltage signal $V_{IN}$ so that the defined current $I_D$ is dependent on (e.g. proportional to) the input voltage signal $V_{IN}$. The voltage $V_A$ may then be inversely proportional to $V_{IN}$ so that the gate-source voltage of the sampling transistor $M_S$ in the output configuration ($V_{DD2}$+ ($V_{DD1}-V_A$)$-V_{IN}$) becomes substantially independent of $V_{IN}$ (i.e., $V_{GS}$ is constant). Alternatively, continuing with control of the sampling transistor $M_S$, the current source 220 may be controlled by both $V_{IN}$ and the control signal CS (or, as indicated in the variant 220X at the bottom left in FIG. 4, replaced by two current sources 220A, 220B in parallel, one of which 220A is controlled by $V_{IN}$ and the other of which 220B is controlled by CS). In such a case, the voltage $V_A$ may be inversely proportional to $V_{IN}$ but with a DC (or relatively/very low frequency) shift based on CS so that the gate-source voltage of the sampling transistor in the output configuration becomes substantially independent of $V_{IN}$ but with a DC shift based on CS. In this case, an instance of the switching circuitry 400 of FIG. 4 (without variant 220X) may separately be used to control the second sample-path transistor $M_P$ but with the current source either being a non-controllable current source or being controlled by a fixed control signal (other than CS).

It is noted that the above variant of the switching circuitry 400, adopting the variant 220X at the bottom left in FIG. 4 and controlling the sampling transistor $M_S$ (rather than $M_P$ as shown in FIG. 4 itself), may be provided as part of the clock-controlled circuitry 330 when the top plate sampling topology is adopted as in variant 300TP in FIG. 3. It is recalled that in this case the transistors $M_P$ and $M_Q$ are not present, and thus the clock-controlled circuitry 330 need only control the sampling transistor $M_S$. With the variant 220X, as explained above, the voltage $V_A$ may be inversely proportional to $V_{IN}$ but with a DC shift based on CS so that the gate-source voltage of the sampling transistor $M_S$ in the output configuration becomes substantially independent of $V_{IN}$ but with a DC shift based on CS.

Returning to FIG. 4, in general it is not essential that the current source 220 be a controllable current source, or that it be controlled by the input voltage signal $V_{IN}$. Instead, the capacitance of the capacitor $C_{B1}$ may be adjusted/controlled/trimmed based on the control signal CS, to instead adjust/control the control voltage by controlling a charge stored by the capacitor $C_B$. Similarly, one or both of $V_{DD1}$ and $V_{DD2}$ could be adjusted/controlled/trimmed based on the control signal CS.

As mentioned above, and for the avoidance of any doubt, the transistors herein may be implemented as field-effect transistors, or any other type of transistor. The transistors may be implemented as MOSFET type transistors.

As mentioned above, the current source 220 in FIG. 4 is controllable, with the control signal CS used to control the current $I_D$. The control signal CS may comprise a control voltage signal (CVS), and the controllable current source 220 may be configured such that the defined current $I_D$ is dependent on a voltage level of the control voltage signal.

Generally, the controllable current source may comprise at least one transistor connected to control the defined current $I_D$ based on its gate voltage and the at least one transistor of the controllable current source may be connected such that its gate voltage is dependent on the control signal CS. For example, the current source may comprise a field-effect transistor whose gate terminal is connected to a control voltage signal CVS which defines the defined current $I_D$.

The control signal CS may comprise a control digital signal (CDS), and the controllable current source may be configured such that the defined current is dependent on a digital value of the control digital signal. The control voltage signal CVS may be generated by a digital-to-analogue converter (DAC) from a control digital signal CDS. The control voltage signal CVS (and the control digital signal CDS) may be, or may be dependent upon, the input voltage signal $V_{IN}$. The control voltage signal CVS (and the control digital signal CDS) may in some arrangements be independent of the input voltage signal $V_{IN}$.

FIG. 5 is a schematic diagram of a switching circuit 500 which is an exemplary arrangement of the clock-controlled circuitry 330 as connected to the sampling transistor $M_S$. The switching circuitry 500 may be referred to as a signal bootstrap circuit and is generally configured to output the control voltage $\phi_b$ to (a gate terminal of) the sampling transistor $M_S$ in accordance with the input clock signal CLK. In some arrangements, operation of the switching circuit 500 may be dependent on the control signal CS. Circuitry 500 is one arrangement of a signal bootstrap circuit which is configured to control a control voltage for controlling one or more of the sample path transistors $M_S$, $M_P$.

As explained above, the switching circuitry 500 may form one of the clock-controlled circuitries of the clock-controlled circuitry 330, in this case representing circuitry configured to control the sampling transistor $M_S$. Additional circuitry for controlling the second sample-path transistor $M_P$ is omitted. A portion of sampling circuitry 310 (comprising input voltage node $V_{IN}$, sampling transistor $M_S$, sampling capacitor $C_S$ and reference node GND) is also shown below the clock-controlled circuitry 330 to aid in the below explanation of how the clock-controlled circuitry 330 operates.

Operation of the switching circuit 500 may be understood by considering how a charge stored by the capacitor $C_{B2}$ changes during a pre-charge (hold) phase and a sample (tracking) phase. The pre-charge phase and the sample phase are based on the value of clock signal CLK. Similarly to FIG. 4, a timing diagram of the clock signal CLK is shown in the top right corner of FIG. 5.

In the pre-charge phase, capacitor $C_{B2}$ is connected such that it charges to a high voltage, and in the sample phase, the voltage stored on the capacitor $C_{B2}$ is pushed to the gate of the sampling transistor $M_S$.

When CLK=high, transistors $N_5$ and $N_{5t}$ are on which brings down the voltage on node G (i.e., at the gate of the sampling switch $M_S$) to ground. This turns OFF the sampling transistor, $M_S$, and the hold phase starts in which the sampled value on the sampling capacitor $C_s$ is held. During this phase (i.e., the hold phase), transistors $N_2$, $N_6$ and $N_7$ are also OFF. The clock signal/CLK (which is an inverted version of the clock signal CLK) is low (i.e.,c /CLK=low). This turns ON transistor $N_8$. This brings up a voltage at the node Z to the supply, i.e., $V_{DD}$. Since node Z is now connected to $V_{DD}$, transistor $N_4$ is OFF. At the same time, since the voltage at node G is at ground (i.e., has a ground supply voltage), transistor $N_3$ is ON. The transistor $N_1$ is also ON (due to CLK=high). In this case, the capacitor CB is connected to ground (GND) at its bottom plate (through $N_1$) and connected to $V_{DD}$ at its top plate (through $N_3$). This is thus also called the precharge phase, since as the sample is held on the sampling capacitor $C_S$, the capacitor $C_{B2}$ is precharged to store the voltage $V_{DD}$.

When CLK=low, transistor $N_5$ is switched OFF and thus node G is disconnected from ground. Transistor $N_8$ is quickly turned OFF (as/CLK=high) and transistor $N_6$ is quickly turned ON (CLK=low) and connects node X (whose voltage level is at ground at the beginning of this phase) to node Z which in turn brings down the voltage on node Z from $V_{DD}$ to ground. This turns on the transistor $N_4$ and connects node Y to node G. In this case, the voltage on node G starts to rise (since node Y was charged to $V_{DD}$ during the precharge/hold phase). While the voltage on node G is rising, the transistors $N_2$ and $N_7$ start to conduct (in other words, they turn ON). This raises the voltage at node Z and at node X towards the voltage of the input signal, $V_{IN}$, connected to a drain terminal of transistor $N_2$ via node W. At this point, the voltage at node Y is raised to $V_{DD}+V_{IN}$ (since $V_{DD}$ is the initial voltage over the capacitor $C_{B2}$). This voltage ($V_{DD}+V_{IN}$) is transferred to node G (i.e., the gate of sampling switch, $M_S$). In this case, the gate-source voltage of the sampling transistor $M_S$ is $V_{DD}+V_{IN}-V_{IN}=V_{DD}$ (which is constant and independent of the input signal $V_{IN}$). As mentioned before, this phase is called the sample (sampling, tracking or output) phase, in which the sampling switch $M_S$ is ON and the voltage across the sampling capacitor $C_s$ tracks the input signal $V_{IN}$.

Similar to switching circuit 400, the control signal CS may in some arrangements control the capacitance of capacitor $C_{B2}$ (the voltage-boost capacitor) to control a control voltage output from the switching circuit 500 (or clock-controlled circuitry 330) via node G (which effectively acts as an output node, shown in this arrangement as being connected to the sampling transistor $M_S$).

It will be understood as above that while different switching circuits, or bootstrap circuits/arrangements/configurations, have been described in respect of switching circuits 400 and 500, either arrangement may be used in connection with any of the one or more sample-path transistors, depending on the application. For example, the switching circuit 400 (described as being connected to the second sample-path transistor $M_P$) may instead be connected to the sampling transistor $M_S$.

In some arrangements, the clock-controlled circuitry 330 comprises switching circuitry 400 connected to the second sample-path transistor $M_P$, and switching circuitry 500 connected to the sampling transistor $M_S$. The control signal CS output from the control circuitry 320, and received by the clock-controlled circuitry 330 may be a single control signal common to both switching circuitry 400 and 500, or a plurality of control signals which are different for switching circuitry 400 and 500 (i.e., the control circuitry 320 may control the clock-controlled circuitry of each of the one or more sample-path transistors independently using a plurality of control signals). Similarly, the clock signal CLK may be the same, or different for each of the clock-controlled circuitry associated with the one or more sample-path transistors.

It should be noted that although the transformation from control signals to control voltages output by the clock-controlled circuitry, to e.g., on-resistance of the one or more sample-path transistors and consequently frequency bandwidth, is not necessarily linear, as long as the transformation is monotonic, control circuitry 320 can be designed to account for the transformations, or an optimal point can be found easily (e.g. by iterative calibration).

Turning to transistor $M_Q$, any of switching circuitry 400 and switching circuitry 500 (taking into account the variants described above) may be provided in the clock-controlled circuitry 330 and connected to output the control voltage $\phi_c$ to (a gate terminal of) the transistor $M_Q$ in accordance with the input clock signal CLK. Transistor $M_Q$ is shown as a P-channel transistor whereas transistors $M_S$ and $M_P$ are shown as N-channel transistors, and thus such control may turn transistor $M_Q$ on when transistors $M_S$ and $M_P$ are off, and vice versa.

Incidentally, either or both of transistors $M_S$ and $M_Q$ may in some arrangements be controlled directly by the clock signal CLK without needing a bootstrap circuit such as switching circuitry 400 or switching circuitry 500 to raise the voltage level of the signal applied to their gate terminals.

Further, delay circuits (not shown in FIGS. 3 to 5 but introduced in FIG. 6 as described below) may be provided to delay signal $\phi_b$ relative to signal $\phi_a$, and to delay signal $\phi_c$ relative to signal $\phi_b$, so that transistor $M_P$ turns safely on before transistor $M_S$ turns on, so that transistor $M_P$ turns off before transistor $M_S$ turns off, and so that transistors $M_S$ and $M_P$ are both safely off before transistor $M_Q$ turns on.

Considering now the control circuitry 320 of FIG. 3, the control circuitry may be configured, based on measures of the performance property of the sampling circuit 310 and a reference (starting or default) performance property, to control the performance property of the sampling circuit 310 to reduce a difference between those performance properties. Such measures may be obtained by analysing the samples of the series of sample phases, i.e. the output at $V_{OUT}$ (or corresponding digital samples based on analogue-to-digital conversion of the analogue voltage samples), as indicated by the dot-dashed line in FIG. 3.

Based on a measure of a performance property of the sampling circuit 310, the control circuitry may be configured to control the performance property (by adjusting the control signal CS output to the clock-controlled circuitry 330) to reduce a difference between a measured performance and a reference/starting/default performance.

For example, the performance property may be the frequency bandwidth, or the gain or phase at a given frequency, as discussed earlier. Such a performance property (of the sampling circuitry 300) may be measured (e.g., by the control circuitry or by additional circuitry) and the control circuitry 320 may be configured to control the property by controlling the control signal CS output to the clock-controlled circuitry 330.

In one exemplary arrangement, where the property (e.g. bandwidth/gain/phase) should be increased (relative to a reference value of the property), the control circuitry 320 may adjust the value of the control signal CS to increase (or decrease, as the case may be) a control voltage output by the clock-controlled circuitry 330 (where the control voltage output by the clock-controlled circuitry is increased/decreased e.g., via adjustment of the controllable current source 220) received by the one or more sample-path transistors.

For example, the control signal CS may be used to adjust the voltage level of the control voltage $\phi_a$ used to control the on resistance of the transistor $M_P$ during the sample phases to control the frequency bandwidth of the sampling circuit 310. In some arrangements the control signal CS may be used to control the voltage level of the control voltage $\phi_a$ used to control the on resistance of the transistor $M_P$ but not to similarly control voltage levels of the control voltages $\phi_b$ or $\phi_c$.

Control circuitry 320 may generate the clock signal CLK, or clock signal CLK may be supplied from external circuitry (not shown). The clock-controlled circuitry 330 may receive the clock signal CLK from the control circuitry 320 (i.e., as well as the control signal CS).

Figure 6:
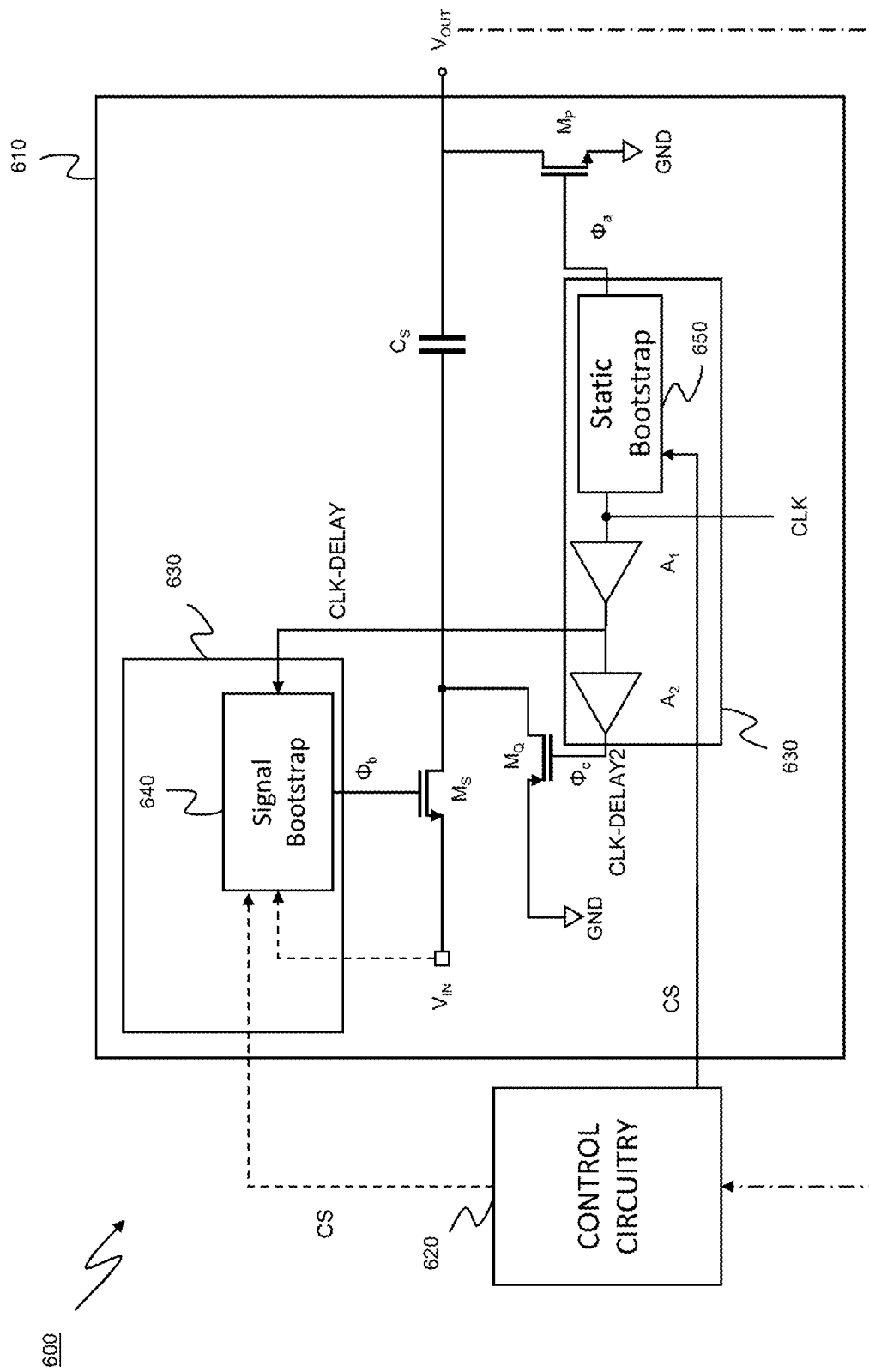
FIG. 6 is a schematic diagram of sampling circuitry embodying the present invention.

FIG. 6 is a schematic diagram of sampling circuitry 600, embodying the present invention. FIG. 6 is similar to FIG. 3, where like elements have been denoted with corresponding like reference signs. Repeat description of these elements will be omitted.

Clock controlled circuitry 330 is shown in FIG. 6 as two discrete clock-controlled circuitry 630 blocks containing clock-controlled circuitry for connection to the sampling transistor $M_S$ and the second sample-path transistor $M_P$. The two blocks may collectively be referred to as clock-controlled circuitry 630. It will be understood that the signal bootstrap 640 represents switching circuitry 500 described in relation to FIG. 5, and that the static bootstrap 650 represents switching circuitry 400 described in relation to FIG. 4.

Additionally, clock-controlled circuitry 630 comprises first and second delay buffers A1 and A2. The first buffer A1 is connected to receive the input clock signal CLK, and output a delayed clock signal CLK-DELAY to the signal bootstrap 650. The second buffer A2 is connected to receive the delayed clock signal CLK-DELAY and output a further delayed clock signal CLK-DELAY2 to (a gate terminal of) the transistor $M_Q$.

The delayed clock signal CLK-DELAY received by the signal bootstrap 640 may replace the clock signal CLK received by switching circuit 500. The first and second buffers A1 and A2 serve to delay the clock signal CLK according to delays caused by the clock-controlled circuitry 330 (i.e., signal path delays, delays caused by the different switching circuitry inside the signal bootstrap 640 and static bootstrap 650) and switching timing of the sampling circuit. The first and second buffers A1 and A2 also serve to delay signal $\phi_b$ relative to signal $\phi_a$, and to delay signal $\phi_c$ relative to signal $\phi_b$, so that transistor $M_P$ turns safely on before transistor $M_S$ turns on, so that transistor $M_P$ turns off before transistor $M_S$ turns off, and so that transistors $M_S$ and $M_P$ are both safely off before transistor $M_Q$ turns on. Note that in FIG. 6 the control signal $\phi_c$ is not generated by a bootstrap circuit and is the same as the further delayed clock signal CLK-DELAY2.

Operation of the circuit is otherwise similar to that described in relation to FIG. 3, taking into account the operation of the circuits of FIGS. 4 and 5.

Control circuitry 620 is shown as outputting two control signals CS, one to each discrete clock-controlled circuitry 630 block, for ease of understanding, however it should be understood that a signal received by one block is available to the other block since clock-controlled circuitry 630 is collectively both blocks.

The control signal connecting the signal bootstrap 640 and the control circuitry 620 is shown as a dashed line, indicating such a control signal connection is optional. In some arrangements, signal bootstrap 640 may be configured to control the sampling transistor based only on $V_{IN}$ (a connection to $V_{IN}$ is shown with another dashed line), i.e., without requiring control signal CS.

While the present invention has so far been described in the context of 'single-ended' circuitry (i.e., using a single input voltage $V_{IN}$ with reference to a common reference node or ground potential), differential (or 'double-ended') circuitry arrangements are also envisaged. Also, while the present invention has so far been described mainly in the context of a single channel, multi-channel circuitry arrangements are also envisaged.

Figure 7:
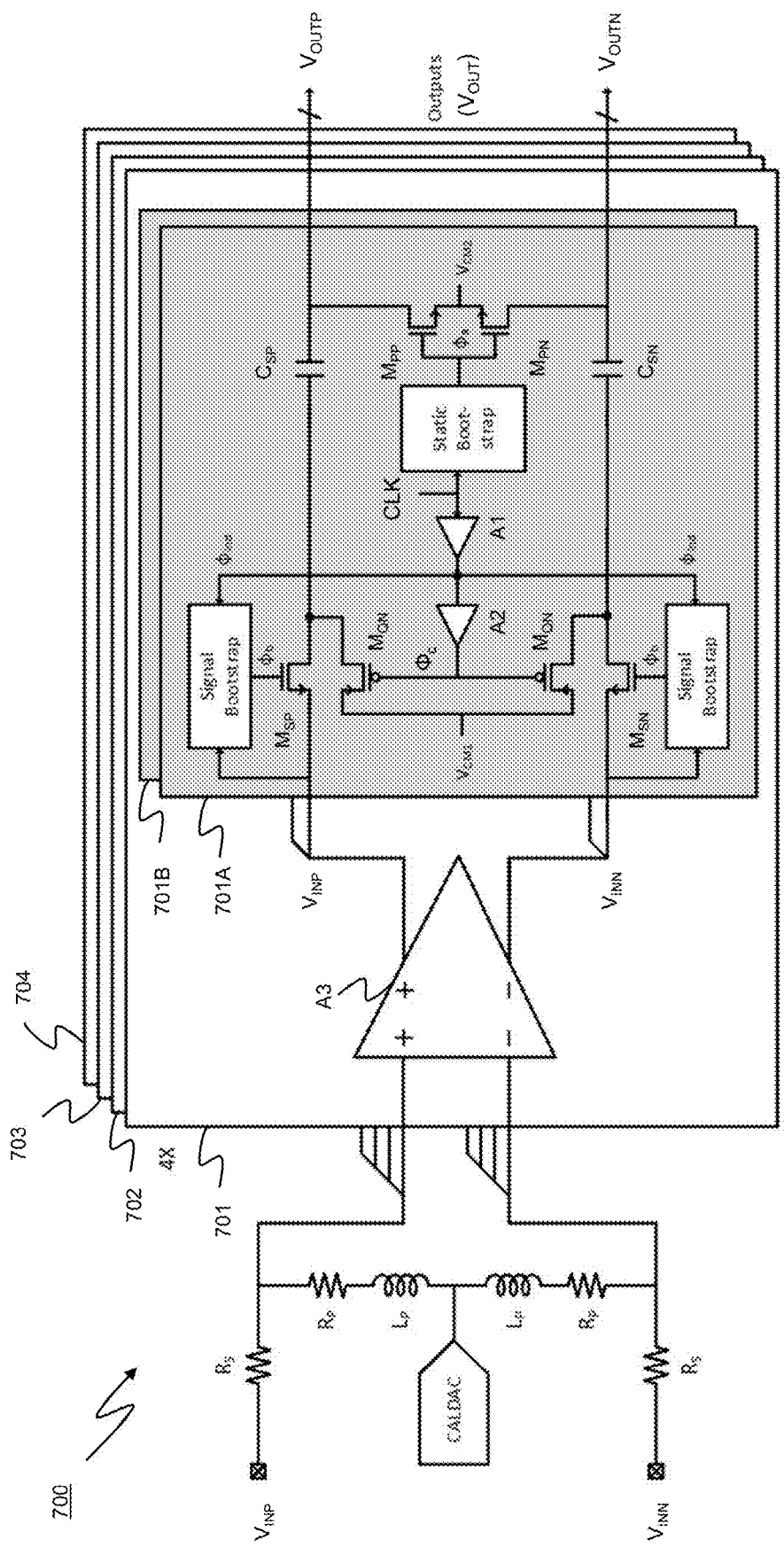
FIG. 7 is a schematic diagram of differential, multi-channel sampling circuitry embodying the present invention.

FIG. 7 is a schematic diagram of differential, multi-channel sampling switch circuitry 700 according to the present invention.

The circuitry of FIG. 7 will be considered in multiple stages.

Considering first only the circuit arrangement shown in the front-most shaded square 701A, the circuit arrangement shows differential sampling circuitry. The circuit arrangement 701A effectively shows a first sampling circuitry 600 and a second sampling circuitry 600 of FIG. 6 (where the buffers A1, A2, and static bootstrap are shared between the first and second circuitry, and control circuitry 620 and various signal connections such as control signal CS are omitted for simplicity). The two sets of sampling circuitry correspond to an upper, positive signal path and a lower, negative signal path, forming a differential pair and collectively defining differential circuitry. Reference signs with an added suffix P or N have been employed to indicate like elements to those in FIG. 6 for the positive (P) path and negative (N) path, respectively.

Although not explicitly shown as being grouped as such, the positive and negative signal bootstraps, static bootstrap and delay buffers may collectively form clock-controlled circuitry corresponding to clock-controlled circuitry 630. Similarly, the positive and negative input voltage nodes $V_{INP}$ and $V_{INN}$ (wherein $V_{INP}$ corresponds to a positive input voltage node and $V_{INN}$ corresponds to a negative input voltage node), positive and negative sampling capacitors $C_{SP}$ and $C_{SN}$, positive and negative sampling transistors $M_{SP}$ and $M_{SN}$, positive and negative transistors $M_{PP}$ and $M_{PN}$, positive and negative transistors $M_{QP}$ and $M_{QN}$, and their interconnections, may collectively form the parts of a sampling circuit 701A corresponding to sampling circuit 610, other than those parts which correspond to clock-controlled circuitry 630.

The transistors $M_{QP}$ and $M_{QN}$ are connected between the input voltage nodes $V_{INP}$ and $V_{INN}$ and a first common mode reference node $V_{CM1}$ (i.e., instead of a reference voltage node GND) via the sampling transistors $M_{SP}$ and $M_{SN}$, respectively, and are controlled by the output $\phi_c$ of the second buffer A2. The second sample-path transistors $M_{PP}$ and $M_{PN}$ are connected between the sampling capacitors $C_{SP}$ and $C_{SN}$ and a second common mode reference node $V_{CM2}$ (i.e., instead of a reference voltage node GND), respectively, and are controlled by the output $\phi_a$ of the static bootstrap.

Operation of the circuitry is comparable to that described above in relation to FIG. 6, but where a differential input voltage is received at the two input voltage nodes $V_{INP}$ and $V_{INN}$, and wherein the output $V_{OUT}$ is a differential output voltage produced at the corresponding two output voltage nodes $V_{OUTP}$ and $V_{OUTN}$. Considering next the circuit arrangement of the two shaded squares 701A and 701B, this particular circuit arrangement shows multi-channel differential sampling circuitry 701.

Shaded square 701B is considered to include the same circuitry arrangement as shown in the shaded square 701A, with those shaded squares corresponding to sampling circuits 701A and 701B each corresponding to sampling circuit 610 but being a differential circuit. The sampling circuits 701A and 701B share a common input buffer A3 (and perform sampling on the same input signal). The sampling circuits 701A and 701B (shaded squares) may indicate sets of differential sampling circuitry arranged for time-interleaved operation. It will be appreciated that such a configuration may be useful at the front-end of a time-interleaved ADC, where the respective clock signals CLK for the sampling circuits 701A and 701B are time-interleaved clock signals. Of course, two channels is merely a convenient example, and any number of channels are envisaged.

In one arrangement, sampling circuitry 700 therefore comprises a sampling circuit which is a first sampling circuit 701A; the sampling circuitry 700 comprises a second sampling circuit 701B; and the control circuitry (not shown) is configured, based on measures of the performance properties of the first and second sampling circuits, to control the performance property of the first sampling circuit to reduce a difference between those performance properties.

That is, a measure of the performance property of the first sampling circuit 701A may be compared to a measure of the performance property of second sampling circuit 701B, and the control circuitry may be configured to reduce a difference between those measures of the performance property. For example, the frequency bandwidth (or gain or phase at a given frequency) of the first sampling circuit (i.e., the first channel) 701A may be measured and compared to the frequency bandwidth (or gain or phase at the given frequency) of the second sampling circuit (i.e., the second channel) 701B. The control circuitry may be configured to control the performance property (here, bandwidth/gain/phase, as above) by adjusting the value of the control signal which controls the clock-controlled circuitry of one or more of the first and second sampling circuits to reduce the difference between the measures of the performance property (e.g., by increasing or decreasing a control voltage for one or both of the sampling circuits).

Considering next the circuit arrangement of the four unshaded squares 701, 702, 703 and 704, this particular circuit arrangement shows further multi-channel differential sampling circuitry 700.

Unshaded squares 702, 703 and 704 are considered to include the same circuitry arrangement as shown in the unshaded square 701 (i.e. the two shaded squares 701A and 701B). The unshaded squares 701, 702, 703 and 704 share a common input (and perform sampling on the same input signal). The unshaded squares 701, 702, 703 and 704 may indicate sets of multi-channel differential sampling circuitry arranged for time-interleaved operation. In this case, there may be considered to be eight channels, that is two for each of the four unshaded squares 701, 702, 703 and 704. It will be appreciated that such a configuration may be useful at the front-end of a time-interleaved ADC, where the respective clock signals CLK for the sampling circuits 701A and 701B for each of the four unshaded squares 701, 702, 703 and 704 are time-interleaved clock signals. Of course, eight channels is merely a convenient example (different from the two channels described above), and any number of channels are envisaged.

In one arrangement, the first sampling circuit 701A of circuitry 701 may be a candidate sampling circuit and the second sampling circuit 701B of circuitry 701 is a reference sampling circuit. The sampling circuitry 700 may further comprise a plurality of candidate sampling circuits 701A for unshaded square 701, and 701A and 701B for each of the three further unshaded squares 702, 703 and 704.

In such an arrangement, the control circuitry (not shown) may be configured to control a performance property of each of the candidate sampling circuits by controlling, for each candidate sampling circuit, a magnitude of the control voltage of at least one of the one or more sample-path transistor circuits applied by the clock-controlled circuitry in the sample phases. In such an arrangement, the control circuitry is configured, based on measures of the performance properties of the candidate and reference sampling circuits, to control the performance properties of the candidate sampling circuits to reduce differences between the performance properties of the candidate sampling circuits 701A for unshaded square 701 and 701A and 701B for each of the three further unshaded squares 702, 703 and 704 and the performance property of the reference sampling circuit 701B of circuitry 701.

For example, a calibration method may involve controlling the performance properties of the candidate sampling circuits by iteratively adjusting the control signals sent by the control circuitry (not shown) and received by the clock-controlled circuitry of each candidate sampling circuit. This may be referred to as a calibration method, to calibrate, or optimise, a performance property (for example, frequency bandwidth matching across channels, or matching across channels of gain or phase at a given frequency) of the overall sampling circuitry 700.

Controlling the control voltage magnitude may comprise adjusting the control voltage magnitude such that a performance property is substantially equal across the candidate sampling circuits (or channels), or across all of the sampling circuits (or channels), or until a maximum value of the performance property is reached. Such adjusting may be achieved over a plurality of adjustment cycles, where the performance property is measured, and readjusted based on a current measurement of the performance property and a previous, or default, measurement of the performance property.

Controlling the control voltage magnitude may comprise adjusting the value of the control voltage signal such that a performance property is substantially equal across the candidate sampling circuits (or channels), or across all of the sampling circuits (or channels), or until a maximum value of the performance property is reached, in the same manner as above.

In the above-described multi-channel differential sampling circuits, reference voltages may be common to (i.e. shared between) the different channels, or each channel may have its own reference voltages. Each channel has its own differential pair of output nodes (where the circuitry is differential circuitry), and may output the result of a sampling process to further time-interleaved circuitry (e.g., for analogue-to-digital conversion in line with FIG. 1). It will be appreciated that the clocks signals (e.g., CLK and/CLK used in the clock-controlled circuitry of each of the channels of the multi-channel differential clock circuitry) may vary in their frequency and duty-cycle with respect to the timing diagrams shown in the top right corner of FIGS. 4 and 5, for use in such a multi-channel configuration.

It will be appreciated that any of the single-channel sampling circuit configurations disclosed herein (circuitry 300 or 600), or variations of those circuits using any clock-controlled circuitry configuration of FIGS. 4 and 5, could be used as the basis of a multi-channel configuration.

With reference to the example application in a time-interleaved ADC described above, any mismatch in performance properties between the individual sample-and-hold circuits (S/Hs) will cause spurious tones which will significantly degrade the SFDR (spurious-free dynamic range) performance. The front-end sampling of the signal with eight interleaved S/Hs (e.g., the sampling circuits 701A and 701B for each of the four unshaded squares 701, 702, 703 and 704 of FIG. 7) ensures that timing skew and bandwidth/gain/phase mismatch calibrations can be focused on these eight channels, even if there is further demultiplexing into a large number of sub-channels downstream in the time-interleaved ADC architecture. In this regard, a calibration method may involve measuring a combined performance property of the combination of the sampling circuits, such as SFDR performance, and controlling the combined performance property by controlling, for at least one of the candidate sampling circuits or each of the candidate sampling circuits, a magnitude of the control voltage of at least one of its one or more sample-path transistor circuits applied by the clock-controlled circuitry. Another example combined performance property is a magnitude of a maximum image spur in an image spur versus frequency analysis of samples of the series of sample phases of the sampling circuits. Such performance properties may be measured or estimated based on the analogue voltage samples or corresponding digital samples following analogue-to-digital conversion.

According to the above description, sampling circuitry using S/H circuits with bottom plate sampling with signal bootstrapped switches on the signal side (i.e., connected to the sampling capacitors $M_S$) and a programmable current controlled static bootstrap on the common mode side (i.e., connected to the second sample-path transistors $M_P$) are envisaged. While this technique allows for sampling with high linearity and an independent choice of common modes for the input buffer and next stages, it also facilitates the correction of random bandwidth mismatches between the parallel channels. Also as above, the present techniques may be applied to a top plate sampling topology, for example using variants 220X and 300TP explained in connection with FIGS. 3 and 4 to control the sampling capacitors $M_S$ in the parallel channels.

Figure 8:
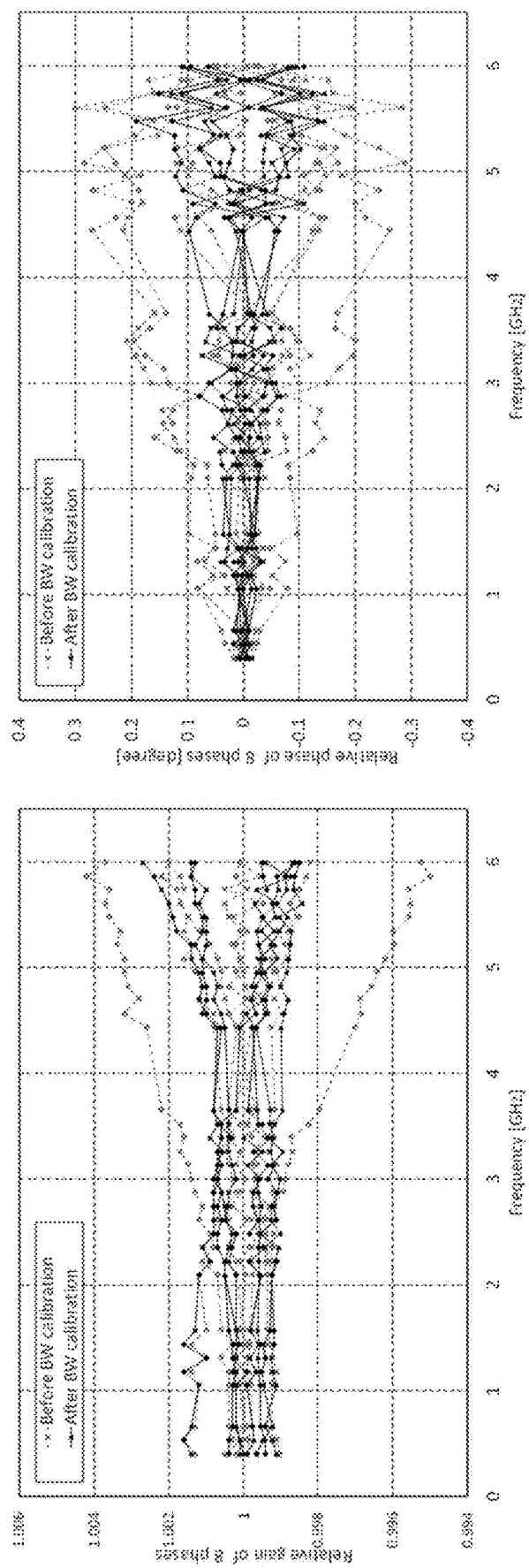
FIG. 8 shows results of sampling circuitry comprising 8 channels (or phases) before and after calibration of a performance property.

FIG. 8 shows results for the sampling circuitry 700 of FIG. 7, which comprises eight channels (or phases) as mentioned above, assuming time-interleaved operation across those channels. Performance properties are shown for the eight channels before and after calibration to reduce performance property mismatch between the channels. The circuitry was implemented in silicon as the front-end of a time-interleaved ADC for the calibration although similar results (not shown) were obtained by simulation.

The left graph of FIG. 8 plots relative gain per phase (channel) vs frequency for each of the eight channels. The right graph plots relative phase per phase (channel) vs frequency, also for each of the eight channels (phases). The dashed lines in FIG. 8 represent plots before calibration, and the solid lines represent plots after calibration (i.e., after calibrating the values of the control signals for the respective channels, or for all but one reference channel of the channels).

As can be seen by considering the left graph, there is significant improvement (reduction in mismatch between channels) to the relative gain per phase (channel) of the 8-phase time-interleaved ADC after undergoing the calibration, evidenced by a tighter spread of relative gain (indicating that the different channels are better matched) at high frequency and across frequency generally.

Similarly, as can be seen by considering the right graph, there is also improvement to the relative phase per phase (channel), evidenced again by a tighter spread of relative phase (indicating smaller phase differences between the different channels) at high frequency and across frequency generally. Again, a reduction in mismatch between the channels can be seen.

Looking at FIG. 8, the reduction in mismatch may be achieved in different ways, depending on the specific performance property chosen. For example, the gain at 6 GHz (as an example given frequency, i.e. at the maximum frequency of the target frequency bandwidth), or the phase at 6 GHz, or a combination of the gain and phase at 6 GHz, may be taken as the performance property. In this case, the mismatch reduction would be targeted at the given frequency with the mismatch generally across the frequency bandwidth also being reduced. The given frequency may be a frequency towards or at the upper end of the target frequency bandwidth of the sampling circuits/circuitry (since the problem of mismatch is typically exacerbated at higher frequencies). In general, any frequency (in the bandwidth) may be chosen. In some arrangements, multiple frequencies may be chosen and average performance properties considered.

Figure 9:
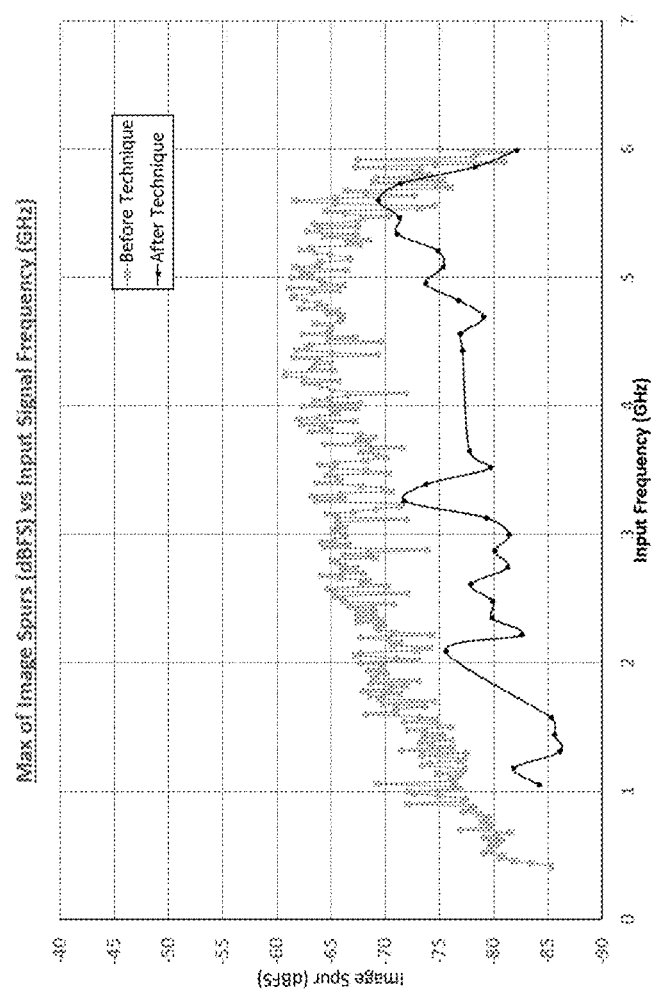
FIG. 9 shows results of sampling circuitry before and after calibration of a performance property.

FIG. 9 shows further results for the same circuitry as for FIG. 8, subjected to the same calibration process. A plot of the image spurs vs frequency is shown, where, as before, the dashed line (also represented as a lighter grey colour) represents a plot before calibration, and the solid line (also represented as a darker black colour) represents a plot after calibration. An improvement (i.e., a decrease) in the level of image spurs due to (bandwidth) mismatch following bandwidth calibration can be seen, with a peak spurs level reduced to around −70 dBFS. As above, the level of image spurs may be taken as an example combined performance property.

Figure 10:
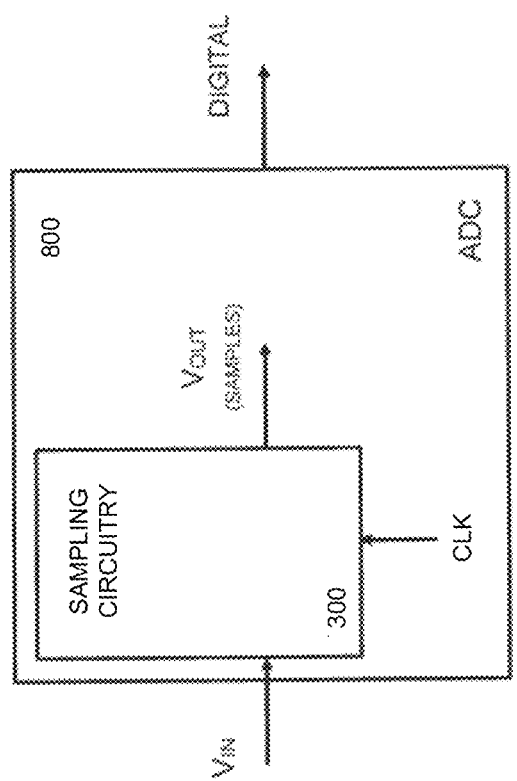
FIG. 10 is a schematic diagram of an ADC embodying the present invention.

FIG. 10 is a schematic diagram of an ADC 800 embodying the present invention. The ADC 800 comprises any of the sampling circuitries disclosed herein, indicated as 300 in FIG. 10 for simplicity but of course sampling circuitry 600, 700, 701, 701A is equally applicable. The ADC 800 may in turn output a digital signal, as shown, based on the voltage mode samples $V_{OUT}$. As above, the performance properties considered herein may be measured or estimated based on the digital signal.

Figure 11:
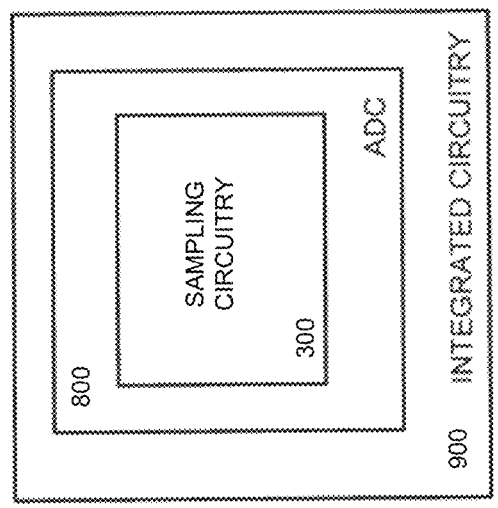
FIG. 11 is a schematic diagram of integrated circuitry embodying the present invention.

Any of the circuitry disclosed herein may be implemented as integrated circuitry or as an integrated circuit, for example as (or as part of) and IC chip, such as a flip chip. FIG. 11 is a schematic diagram of integrated circuitry 900 embodying the present invention. The integrated circuitry 900 may comprise the ADC 800 of FIG. 10 and/or any of the sampling circuitries previously disclosed herein (such as sampling circuitry 300, 600, 700, 701, or 701A), indicated as 300 in FIG. 11 for simplicity.

Integrated circuitry 900 may be representative of some or all of an IC chip. The present invention extends to integrated circuitry and IC chips as mentioned above, circuit boards comprising such IC chips, and communication networks (for example, internet fiber-optic networks and wireless networks) and network equipment of such networks, comprising such circuit boards.

The present invention may be embodied in many different ways in the light of the above disclosure, within the spirit and scope of the appended claims.

The description extends to the following set of numbered statements:

A1. A sample and hold (track and hold) circuit comprising:
    an input node to which an input voltage signal is configured to be supplied;
    a first reference voltage node to which a first reference voltage potential is configured to be supplied;
    a sampling capacitor circuit;
    a sampling switch transistor circuit connected between the input node and the sampling capacitor circuit;

a first common mode switch transistor circuit connected between the sampling capacitor circuit and the first reference voltage node;
a signal bootstrap circuit configured to generate a first control voltage based on a clock signal, the first control voltage varying according to a level of the input voltage signal, and configured to control the sampling switch transistor circuit based on the first control voltage; and
a static bootstrap circuit configured to generate a second control voltage based on the clock signal, the second control voltage being programmable, and configured to control the first common mode switch transistor circuit based on the second control voltage.

A2. The sample and hold (track and hold) circuit of statement A1,
wherein the static bootstrap circuit is a voltage controlled clock level shifter circuit.

A3. The sample and hold (track and hold) circuit of statement A1 or A2,
wherein the static bootstrap circuit is configured to operate based on a power supply voltage, and the second control voltage is larger than the power supply voltage.

A4 The sample and hold (track and hold) circuit of any of statements A1 to A3, comprising:
a second reference voltage node to which a second reference voltage potential is configured to be supplied; and
a second common mode switch transistor circuit connected between the second reference voltage node and a connection node between the sampling switch transistor and the sampling capacitor circuit,
wherein the second common mode switch transistor circuit is configured to be controlled based on the clock signal.

A5. The sample and hold (track and hold) circuit of any of statements A1 to A4, wherein the first control voltage is configured to be supplied to a gate of the sampling switch transistor circuit, and the second control voltage is configured to be supplied to a gate of the first common mode switch transistor circuit.

A6. The sample and hold (track and hold) circuit of any of statements A1 to A5, wherein the sample and hold (track and hold) circuit is a bandwidth controlled bottom plate sampler circuit, and a bandwidth of the sample and hold (track and hold) circuit is calibrated based on the second control voltage.

A7. The sample and hold (track and hold) circuit of statement S6, wherein the static bootstrap circuit is configured to vary the second control voltage so that the bandwidth of the sample and hold (track and hold) circuit is calibrated.

A8. The sample and hold (track and hold) circuit of statement A6 or A7, wherein the bandwidth of the sample and hold (track and hold) circuit is lower as the second control voltage is higher.

A9. An analog-to-digital converter (ADC) circuit comprising:
a plurality of the sample and hold (track and hold) circuits of any of statements A1 to A8; and
a plurality of sub-ADC circuits each configured to receive an output signal from a corresponding one of the plurality of the sample and hold (track and hold) circuits and perform an analog-to-digital conversion of the output signal.

A10. A sample and hold (track and hold) circuit comprising
a first input node to which one of differential input voltage signals is configured to be supplied;
a second input node to which the other of the differential input voltage signals is configured to be supplied;
a first reference voltage node to which a first reference voltage potential is configured to be supplied;
a first sampling capacitor circuit;
a second sampling capacitor circuit;
a first sampling switch transistor circuit connected between the first input node and the first sampling capacitor circuit;
a second sampling switch transistor circuit connected between the second input node and the second sampling capacitor circuit;
a first common switch transistor circuit connected between the first sampling capacitor circuit and the first reference voltage node;
a second common switch transistor circuit connected between the second sampling capacitor circuit and the first reference voltage node;
a first signal bootstrap circuit configured to generate a first control voltage based on a clock signal, the first control voltage varying according to a level of the one of differential input voltage signals, and configured to control the first sampling switch transistor circuit based on the first control voltage; and
a second signal bootstrap circuit configured to generate a second control voltage based on the clock signal, the second control voltage varying according to a level of the other of the differential input voltage signals, and configured to control the second sampling switch transistor circuit based on the second control voltage; and
a static bootstrap circuit configured to generate a third control voltage based on the clock signal, the third control voltage being programmable, and configured to control the first and second common switch transistor circuits based on the third control voltage.

A11. The sample and hold (track and hold) circuit of statement A10,
wherein the static bootstrap circuit is a voltage controlled clock level shifter circuit.

A12. The sample and hold (track and hold) circuit of statement A10 or A11,
wherein the static bootstrap circuit is configured to operate based on a power supply voltage, and the third control voltage is larger than the power supply voltage.

A13. The sample and hold (track and hold) circuit of any of statements A10 to A12, comprising:
a second reference voltage node to which a second reference voltage potential is configured to be supplied;
a third common switch transistor circuit connected between the second reference voltage node and a connection node between the first sampling switch transistor and the first sampling capacitor circuit; and
a fourth common switch transistor circuit connected between the second reference voltage node and a connection node between the second sampling switch transistor and the second sampling capacitor circuit,
wherein the third and fourth common switch transistor circuits are configured to be controlled based on the clock signal, respectively.

A14. The sample and hold (track and hold) circuit of any of statements A10 to A13,
wherein the first control voltage is configured to be supplied to a gate of the first sampling switch transistor circuit, the second control voltage is configured to be supplied to a gate of the second sampling switch transistor circuit, and the third control voltage is configured to be supplied to gates of the first and second common mode switch transistor circuit, respectively.

A15. The sample and hold (track and hold) circuit of any of statements A10 to A14,
wherein the sample and hold (track and hold) circuit is a bandwidth controlled bottom plate sampler circuit, and a bandwidth of the sample and hold (track and hold) circuit is calibrated based on the third control voltage.

A16. The sample and hold (track and hold) circuit of statement A15,
wherein the static bootstrap circuit is configured to vary the third control voltage so that the bandwidth of the sample and hold (track and hold) circuit is calibrated.

A17. The sample and hold (track and hold) circuit of statement A15 or A16,
wherein the bandwidth of the sample and hold (track and hold) circuit is lower as the third control voltage is higher.

A18. An analog-to-digital converter (ADC) circuit comprising
a plurality of the sample and hold (track and hold) circuits of any of statements A8 and A10 to A17; and
a plurality of sub-ADC circuits each configured to receive an output signal from a corresponding one the plurality of the sample and hold (track and hold) circuits and perform an analog-to-digital conversion of the output signal.

A19. Integrated circuitry, such an IC chip, comprising the sample and hold (track and hold) circuit of any of statements A1 to A8 and A10 to A17, or the analog-to-digital converter (ADC) circuit of statement A9 or A18.

The description also extends to the following set of numbered statements:

B1. Sampling circuitry, comprising:
a sampling circuit; and
control circuitry,
wherein the sampling circuit comprises:
an input node, connected to receive an input voltage signal to be sampled;
a reference node, connected to receive a reference voltage signal;
one or more sample-path transistor circuits;
a sampling capacitor connected between the input node and the reference node via the one or more sample-path transistors; and
clock-controlled circuitry configured, in each of a series of sample phases defined by a clock signal, to control a control voltage of the one or more sample-path transistor circuits to conductively connect the sampling capacitor between the input node and the reference node to sample the input voltage signal on the sampling capacitor,
and wherein the control circuitry is configured to control a performance property of the sampling circuit by controlling a magnitude of the control voltage of at least one of the one or more sample-path transistor circuits applied by the clock-controlled circuitry in the sample phases.

B2. The sampling circuitry of statement B1, wherein controlling the control voltage magnitude comprises at least one of:
setting or programming the control voltage magnitude;
calibrating the control voltage magnitude;
adjusting the control voltage magnitude;
controlling the control voltage magnitude so that it tends towards a target magnitude;
controlling the control voltage magnitude so that it is substantially the same for a plurality of sample phases or a plurality of consecutive sample phases.

B3. The sampling circuitry of statement B1 or B2, wherein:
the clock-controlled circuitry is configured to define the control voltage magnitude based on a value of a control signal provided by the control circuitry; and
the control circuitry is configured to control the performance property of the sampling circuit by controlling the value of the control signal.

B4. The sampling circuitry of any of statements B1 to B3, wherein controlling the value of the control signal comprises at least one of:
setting or programming the value of the control signal;
calibrating the value of the control signal;
adjusting the value of the control signal;
controlling the value of the control signal so that it tends towards a target value;
controlling the value of the control signal so that it is substantially the same for a plurality of sample phases or a plurality of consecutive sample phases.

B5. The sampling circuitry of any of statements B1 to B4, wherein the control signal is programmable by the control circuitry, whereby the control voltage magnitude is programmable by the control circuitry.

B6. The sampling circuitry of any of statements B1 to B5, wherein:
the reference node and the reference voltage signal are a first reference node and a first reference voltage signal, respectively;
the sampling circuit comprises a second reference node, connected to receive a second reference voltage signal;
the clock-controlled circuitry comprises control-voltage generation circuitry configured to generate the control voltage of the at least one sample-path transistor circuit by connecting a charged voltage-boost capacitor to the second reference node; and
the control circuitry is configured to control the magnitude of the control voltage by controlling at least one of:
a magnitude of the second reference voltage signal;
a capacitance of the voltage-boost capacitor; and
an amount of charge stored on the voltage-boost capacitor.

B7. The sampling circuitry of statement B6, wherein the control circuitry is configured to control the amount of charge stored on the voltage-boost capacitor by controlling a magnitude of a current used to charge the voltage-boost capacitor.

B8. The sampling circuitry of statement B6 or B7, wherein the control-voltage generation circuitry is a bootstrap circuit or a voltage-controlled clock level shifter circuit.

B9. The sampling circuitry of any of statements B6 to B8, wherein the second reference voltage signal is a power supply voltage signal, and wherein the control-voltage generation circuitry is configured to connect the charged voltage-boost capacitor to the second reference node so that the generated control voltage is larger than a voltage of the second reference voltage signal.

B10. The sampling circuitry of any of statements B6 to B9, wherein the control-voltage generation circuitry is gate-voltage generation circuitry.

B11. The sampling circuitry of any of statements B1 to B10, wherein the control circuitry is configured, based on measures of the performance property of the sampling circuit and a reference performance property, to control the performance property of the sampling circuit to reduce a difference between those performance properties.

B12. The sampling circuitry of any of statements B1 to B11, wherein the control circuitry is configured to control the magnitude of the control voltage of the at least one of the one or more sample-path transistor circuits applied by the clock-controlled circuitry in the sample phases to control the performance property of the sampling circuit and also based on the input voltage signal.

B13. The sampling circuitry of any of statements B1 to B12, wherein the sampling circuit comprises a plurality of sample-path transistor circuits.

B14. The sampling circuitry of statement B13, wherein the control circuitry is configured to control the magnitude of the control voltage of one or only one of the sample-path transistor circuits applied by the clock-controlled circuitry in the sample phases to control the performance property of the sampling circuit.

B15. The sampling circuitry of statement B13, wherein the control circuitry is configured to control the magnitude of the control voltage of one or only one of the sample-path transistor circuits applied by the clock-controlled circuitry in the sample phases to control the performance property of the sampling circuit, and to control the magnitude of the control voltage of another one of the sample-path transistor circuits based on the input voltage signal or based on an input-voltage-signal-independent control signal.

B16. The sampling circuitry of any of statements B1 to B15, wherein each reference voltage signal is a DC reference voltage signal.

B17. The sampling circuitry of any of statements B1 to B16, wherein the sampling capacitor is connected between the input node and the reference node via channels of transistors of the one or more sample-path transistor circuits.

B18. The sampling circuitry of any of statements B1 to B17, wherein the sampling circuit is a sample and hold or track and hold circuit.

B19. The sampling circuitry of any of statements B1 to B18, wherein:
   the at least one of the one or more sample-path transistor circuits is a transistor and wherein the control voltage of that sample-path transistor circuit is a gate voltage of the transistor; and/or
   each sample-path transistor circuit is a transistor and wherein the control voltage of that sample-path transistor circuit is a gate voltage of the transistor.

B20. The sampling circuitry of any of statements B1 to B19 wherein each performance property is or comprises:
   a performance property measurable by analysis of the samples of the series of sample phases; and/or
   a frequency-dependent performance property; and/or
   a performance property at a given frequency, optionally wherein the given frequency is a maximum frequency of a frequency bandwidth or target frequency bandwidth; and/or
   a phase or gain such as a phase or gain at the given frequency; and/or
   a frequency bandwidth.

B21. The sampling circuitry of any of statements B1 to B20, wherein:
   the sampling circuit is a first sampling circuit;
   the sampling circuitry comprises a second sampling circuit; and
   the control circuitry is configured, based on measures of the performance properties of the first and second sampling circuits, to control the performance property of the first sampling circuit to reduce a difference between those performance properties.

B22. The sampling circuit of statement B21, wherein:
   the first sampling circuit is a candidate sampling circuit;
   the second sampling circuit is a reference sampling circuit;
   the sampling circuitry comprises a plurality of candidate sampling circuits;
   the control circuitry is configured to control a performance property of each of the candidate sampling circuits by controlling, for each candidate sampling circuit, a magnitude of the control voltage of at least one of the one or more sample-path transistor circuits applied by the clock-controlled circuitry in the sample phases; and
   the control circuitry is configured, based on measures of the performance properties of the candidate and reference sampling circuits, to control the performance properties of the candidate sampling circuits to reduce differences between the performance properties of the candidate sampling circuits and the performance property of the reference sampling circuit.

B23. The sampling circuitry of any of statements B1 to B20, wherein:
   the sampling circuit is a first sampling circuit;
   the sampling circuitry comprises at least a second sampling circuit;
   the performance property comprises a combined performance property of a combination of the sampling circuits; and
   the control circuitry is configured, based on measures of the combined performance property, to control the magnitude of the control voltage of the at least one of the one or more sample-path transistor circuits of at least one of the sampling circuits to control the combined performance property.

B24. Sampling circuitry, comprising:
   a plurality of sampling circuits; and
   control circuitry,
   wherein each sampling circuit comprises:
      an input node, connected to receive an input voltage signal to be sampled;
      a reference node, connected to receive a reference voltage signal;
      one or more sample-path transistor circuits;
      a sampling capacitor connected between the input node and the reference node via the one or more sample-path transistors; and
      clock-controlled circuitry configured, in each of a series of sample phases defined by a clock signal, to control a control voltage of the one or more sample-path transistor circuits to conductively connect the sampling capacitor between the input node and the reference node to sample the input voltage signal on the sampling capacitor,
   and wherein the control circuitry is configured to control a combined performance property of a combination of the sampling circuits by controlling, for at least one of the sampling circuits or all but one of the sampling circuits, a magnitude of the control voltage of at least one of the one or more sample-path transistor circuits applied by the clock-controlled circuitry in the sample phases.

B25. The sampling circuit of statement B23 or B24, wherein the combined performance property is a magnitude of a maximum image spur in an image spur versus frequency analysis of samples of the series of sample phases of the sampling circuits, or a measurement indicative of SFDR calculated based on the samples of the series of sample phases of the sampling circuits.

B26. Multi-channel sampling circuitry, comprising the sampling circuitry of any of statements B21 to B25, wherein:
each said sampling circuit is configured to operate based on its own clock signal, optionally of set of time-interleaved clock signals; and
the input nodes for said sampling circuits are connected together to form a common input node and receive the same input voltage signal as one another.

B27. An analogue-to-digital converter, comprising the sampling circuitry of any of statements B1 to B25, or the multi-channel sampling circuitry of statement B26.

B28. Integrated circuitry, such an IC chip, comprising the sampling circuitry of any of statements B1 to B25, or the multi-channel sampling circuitry of statement B26, or the analogue-to-digital converter of statement B27.

What is claimed is:

1. A sample and hold circuit comprising:
   an input node to which an input voltage signal is configured to be supplied;
   a first reference voltage node to which a first reference voltage potential is configured to be supplied;
   a sampling capacitor circuit;
   a sampling switch transistor circuit connected between the input node and the sampling capacitor circuit;
   a first common mode switch transistor circuit connected between the sampling capacitor circuit and the first reference voltage node;
   a signal bootstrap circuit configured to generate a first control voltage based on a clock signal, the first control voltage varying according to a level of the input voltage signal, and configured to control the sampling switch transistor circuit based on the first control voltage; and
   a static bootstrap circuit configured to generate a second control voltage based on the clock signal, the second control voltage being programmable, and configured to control the first common mode switch transistor circuit based on the second control voltage.

2. The sample and hold circuit of claim 1,
   wherein the static bootstrap circuit is a voltage controlled clock level shifter circuit.

3. The sample and hold circuit of claim 1,
   wherein the static bootstrap circuit is configured to operate based on a power supply voltage, and the second control voltage is larger than the power supply voltage.

4. The sample and hold circuit of claim 1, comprising:
   a second reference voltage node to which a second reference voltage potential is configured to be supplied; and
   a second common mode switch transistor circuit connected between the second reference voltage node and a connection node between the sampling switch transistor and the sampling capacitor circuit,
   wherein the second common mode switch transistor circuit is configured to be controlled based on the clock signal.

5. The sample and hold circuit of claim 1, wherein the first control voltage is configured to be supplied to a gate of the sampling switch transistor circuit, and the second control voltage is configured to be supplied to a gate of the first common mode switch transistor circuit.

6. The sample and hold circuit of claim 1,
   wherein the sample and hold circuit is a bandwidth controlled bottom plate sampler circuit, and a bandwidth of the sample and hold circuit is calibrated based on the second control voltage.

7. The sample and hold circuit of claim 6,
   wherein the static bootstrap circuit is configured to vary the second control voltage so that the bandwidth of the sample and hold circuit is calibrated.

8. The sample and hold circuit of claim 6,
   wherein the bandwidth of the sample and hold circuit is lower as the second control voltage is higher.

9. An analog-to-digital converter (ADC) circuit comprising
   a plurality of the sample and hold circuits of claim 1; and
   a plurality of sub-ADC circuits each configured to receive an output signal from a corresponding one the plurality of the sample and hold circuits and perform an analog-to-digital conversion of the output signal.

10. Sampling circuitry, comprising:
    a sampling circuit; and
    control circuitry,
    wherein the sampling circuit comprises:
      an input node, connected to receive an input voltage signal to be sampled;
      a reference node, connected to receive a reference voltage signal;
      one or more sample-path transistor circuits;
      a sampling capacitor connected between the input node and the reference node via the one or more sample-path transistors; and
      clock-controlled circuitry configured, in each of a series of sample phases defined by a clock signal, to control a control voltage of the one or more sample-path transistor circuits to conductively connect the sampling capacitor between the input node and the reference node to sample the input voltage signal on the sampling capacitor,
    and wherein the control circuitry is configured to control a performance property of the sampling circuit by controlling a magnitude of the control voltage of at least one of the one or more sample-path transistor circuits applied by the clock-controlled circuitry in the sample phases.

11. The sampling circuitry of claim 10, wherein controlling the control voltage magnitude comprises at least one of:
    setting or programming the control voltage magnitude;
    calibrating the control voltage magnitude;
    adjusting the control voltage magnitude;
    controlling the control voltage magnitude so that it tends towards a target magnitude;
    controlling the control voltage magnitude so that it is substantially the same for a plurality of sample phases or a plurality of consecutive sample phases.

12. The sampling circuitry of claim 10, wherein each performance property is or comprises:
    a performance property measurable by analysis of the samples of the series of sample phases; and/or
    a frequency-dependent performance property; and/or
    a performance property at a given frequency, optionally wherein the given frequency is a maximum frequency of a frequency bandwidth or target frequency bandwidth; and/or
    a phase or gain such as a phase or gain at the given frequency; and/or
    a frequency bandwidth.

13. The sampling circuitry of claim 10, wherein:
    the sampling circuit is a first sampling circuit;
    the sampling circuitry comprises a second sampling circuit; and the control circuitry is configured, based on measures of the performance properties of the first and second sampling circuits, to control the performance property of the first sampling circuit to reduce a difference between those performance properties.

14. Multi-channel sampling circuitry, comprising the sampling circuitry of claim 13, wherein:
each said sampling circuit is configured to operate based on its own clock signal, optionally of set of time-interleaved clock signals; and
the input nodes for said sampling circuits are connected together to form a common input node and receive the same input voltage signal as one another.

15. A sample and hold circuit comprising:
a first input node to which one of differential input voltage signals is configured to be supplied;
a second input node to which the other of the differential input voltage signals is configured to be supplied;
a first reference voltage node to which a first reference voltage potential is configured to be supplied;
a first sampling capacitor circuit;
a second sampling capacitor circuit;
a first sampling switch transistor circuit connected between the first input node and the first sampling capacitor circuit;
a second sampling switch transistor circuit connected between the second input node and the second sampling capacitor circuit;
a first common switch transistor circuit connected between the first sampling capacitor circuit and the first reference voltage node;
a second common switch transistor circuit connected between the second sampling capacitor circuit and the first reference voltage node;
a first signal bootstrap circuit configured to generate a first control voltage based on a clock signal, the first control voltage varying according to a level of the one of differential input voltage signals, and configured to control the first sampling switch transistor circuit based on the first control voltage; and
a second signal bootstrap circuit configured to generate a second control voltage based on the clock signal, the second control voltage varying according to a level of the other of the differential input voltage signals, and configured to control the second sampling switch transistor circuit based on the second control voltage; and
a static bootstrap circuit configured to generate a third control voltage based on the clock signal, the third control voltage being programmable, and configured to control the first and second common switch transistor circuits based on the third control voltage.

* * * * *